(12) United States Patent
Tucker et al.

(10) Patent No.: US 9,443,271 B2
(45) Date of Patent: *Sep. 13, 2016

(54) SYSTEM AND METHOD FOR INCREASING CLARITY AND EXPRESSIVENESS IN NETWORK COMMUNICATIONS

(75) Inventors: Morgan Tucker, San Francisco, CA (US); Jon Watte, Redwood City, CA (US)

(73) Assignee: IMVU, Inc., Mountain View, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/586,551

(22) Filed: Aug. 15, 2012

(65) Prior Publication Data

US 2014/0052794 A1 Feb. 20, 2014

(51) Int. Cl.
| | |
|---|---|
| *G06F 15/16* | (2006.01) |
| *G06Q 50/00* | (2012.01) |
| *G06Q 10/10* | (2012.01) |
| *H04L 12/58* | (2006.01) |
| *G06Q 30/00* | (2012.01) |

(52) U.S. Cl.
CPC ............ *G06Q 50/01* (2013.01); *G06Q 10/107* (2013.01); *H04L 12/58* (2013.01); *H04L 51/063* (2013.01); *G06Q 30/00* (2013.01); *H04L 51/08* (2013.01)

(58) Field of Classification Search
None
See application file for complete search history.

(56) References Cited

U.S. PATENT DOCUMENTS

| | | | | |
|---|---|---|---|---|
| 6,069,622 | A | * | 5/2000 | Kurlander ........... H04L 12/1827 715/753 |
| 7,342,587 | B2 | * | 3/2008 | Danzig et al. ................ 345/473 |
| 7,785,197 | B2 | * | 8/2010 | Smith ............................. 463/30 |
| 2006/0025214 | A1 | * | 2/2006 | Smith ............................. 463/30 |

(Continued)

FOREIGN PATENT DOCUMENTS

| | | |
|---|---|---|
| JP | 2007-025936 | 2/2007 |
| JP | 2007025936 | 2/2007 |

(Continued)

OTHER PUBLICATIONS

International Search Report and Written Opinion received for PCT Patent Application No. PCT/US2013/054591, mailed on Nov. 27, 2013, 11 pages.

(Continued)

*Primary Examiner* — Ranodhi Serrao
(74) *Attorney, Agent, or Firm* — Inventive Patent Law P.C.; Jim H. Salter

(57) ABSTRACT

Embodiments for increasing clarity and expressiveness in network communications include: obtaining a message from a first user as part of a network-enabled conversation with a second user; applying at least one embellishment to the message to produce an embellished message, the embellishment including either an explicitly user-selected embellishment or an automatically generated embellishment based on content of the message; and causing transmission of the embellished message via a network to the second user. Embodiments include: receiving a message from a first user via a network, the message including configuration data for configuring embellishment properties of the message; decoding the configuration data and generating an embellished message with the corresponding embellishment properties, the embellishment properties including either an explicitly user-selected embellishment or an automatically generated embellishment based on content of the message; and displaying the embellished message for the second user as part of a network-enabled conversation with the first user.

29 Claims, 23 Drawing Sheets

(56) References Cited

U.S. PATENT DOCUMENTS

| | | | |
|---|---|---|---|
| 2007/0002057 A1* | 1/2007 | Danzig et al. | 345/473 |
| 2007/0082738 A1* | 4/2007 | Fickie et al. | 463/42 |
| 2007/0208865 A1* | 9/2007 | Morris et al. | 709/228 |
| 2008/0052242 A1* | 2/2008 | Merritt et al. | 705/59 |
| 2008/0091692 A1* | 4/2008 | Keith et al. | 707/100 |
| 2008/0263459 A1* | 10/2008 | Altberg et al. | 715/757 |
| 2008/0263460 A1* | 10/2008 | Altberg et al. | 715/757 |
| 2008/0268418 A1* | 10/2008 | Tashner et al. | 434/365 |
| 2011/0078578 A1* | 3/2011 | Calis | 715/740 |
| 2011/0107239 A1* | 5/2011 | Adoni et al. | 715/757 |
| 2012/0041903 A1* | 2/2012 | Beilby et al. | 706/11 |
| 2012/0054645 A1* | 3/2012 | Hoomani et al. | 715/758 |
| 2012/0054646 A1* | 3/2012 | Hoomani et al. | 715/758 |
| 2012/0191445 A1* | 7/2012 | Markman et al. | 704/2 |
| 2012/0239387 A1* | 9/2012 | Ben-David et al. | 704/203 |
| 2013/0047099 A1* | 2/2013 | Markman et al. | 715/758 |
| 2013/0258040 A1* | 10/2013 | Kaytaz et al. | 348/14.07 |

FOREIGN PATENT DOCUMENTS

| | | |
|---|---|---|
| KR | 10-2003-0046033 | 6/2003 |
| KR | 10-2004-0002828 | 12/2003 |
| KR | 10-2004-0002828 | 1/2004 |
| KR | 10-2010-0129122 | 12/2010 |

OTHER PUBLICATIONS

International Preliminary Report on Patentability received for PCT Patent Application No. PCT/US2013/054591, mailed on Feb. 17, 2015, 7 pages.

International Preliminary Report on Patentability received for PCT Patent Application No. PCT/US2013/054591, mailed on Feb. 26, 2015, 8 pages.

* cited by examiner

Laura Kliene @lauraklien  1h
A friend of mine told me she was yelled at by a product manager, and all I could think was, " Wait. We're allowed to do that?"
Expand Ben Grue (McGraw) @bengrue  1h
@lauraklien not if you want productive engineers and creative! Haha, our work is to high up Maslow to make us feel bad!  Neener Neener!
Expand Laura Kliene @lauraklien  1h
@bengrue note to self hire engineers with lower self esteem.
💬 Hide conversation ← Replay ↻ Retweet  ★ Favorite 4:36 PM − 22 Jun 12 via web  Details Ben Grue (McGraw) @bengrue  1h
@lauraklien emongeneers?
Expand Laura Kliene @lauraklien  1h
@bengrue second note to self.  do not hiregrue.
Expand Ben Grue (McGraw) @bengrue  55m
@lauraklien :(
Expand Timothy Fitz @TimothyFitz  49m
@bengrue You're falling into her trap!  She's lowering your self esteem so she can hire you! /cc @lauraklien
Expand Prestemen @Prestemon  47m
@TimothyFitz @bengrue @lauaklien Hmm, that really opens up some serious questions for me to think about.
Expand Laura Kliene @lauraklien  45m
@prestemon @TimothyFitz @bengrue This is not going well me.
💬 Hide conversation ← Replay ↻ Retweet  ★ Favorite 4:55 PM − 22 Jun 12 via web  Details

SYSTEM AND METHOD FOR INCREASING CLARITY AND EXPRESSIVENESS IN NETWORK COMMUNICATIONS

TECHNICAL FIELD

This application relates to a system and method for use with networked entities, according to one embodiment, and more specifically, a system and method for increasing clarity and expressiveness in network communications.

COPYRIGHT

A portion of the disclosure of this patent document contains material, that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2012 IMVU, Inc., All Rights Reserved.

BACKGROUND

With the promulgation of connected devices, text-based communication has increased in importance over the last several decades. Examples of text-based chat used on devices that are sometimes or always online include mobile phone Short Messaging Services (SMS) and Multimedia Messaging Services (MMS), Online Chat, the Internet Relay Chat network, e-mail and avatar-based chat applications like IMVU.com, and text broadcasting/status updating services like Twitter and Facebook.

Text-based chat can be based on a synchronous, interactive dialog, or can be based on an asynchronous dialog, such as through mobile phone SMS messages, Twitter, online forums, or e-mail. The difference between synchronous and asynchronous communications is that, in synchronous communications, both sender and receiver of a message must be connected to the messaging exchange at the same time, whereas with asynchronous messaging, a sender leaves a message in storage, which is later retrieved and interpreted by the recipient. The best asynchronous messaging systems, such as SMS and Twitter, may appear close to synchronous in nature, because they support, communication latencies of as low as a few seconds, but the technology is still asynchronous and there are limitations to the interactivity afforded by asynchronous communication implementations.

Because of limitations inherent in text transmission, conventions have evolved to express states of mind, the difference between joking and seriousness, and short-hand for various kinds of common expressions. However, these conventions have not sufficiently improved the limitations inherent in conventional text transmission.

BRIEF DESCRIPTION OF THE DRAWINGS

The various embodiments is illustrated by way of example, and not by way of limitation, in the figures of the accompanying drawings in which:

FIG. 3 illustrates a conversation in a 2D asynchronous messaging environment, with chat messages framed as separate panels of text, and participants framed as small 2D images;

FIG. 13 illustrates an example of an online catalog listing avatar actions or items provided by the compose message processing component of an example embodiment;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Background of Various Example Embodiments

Figure 1:
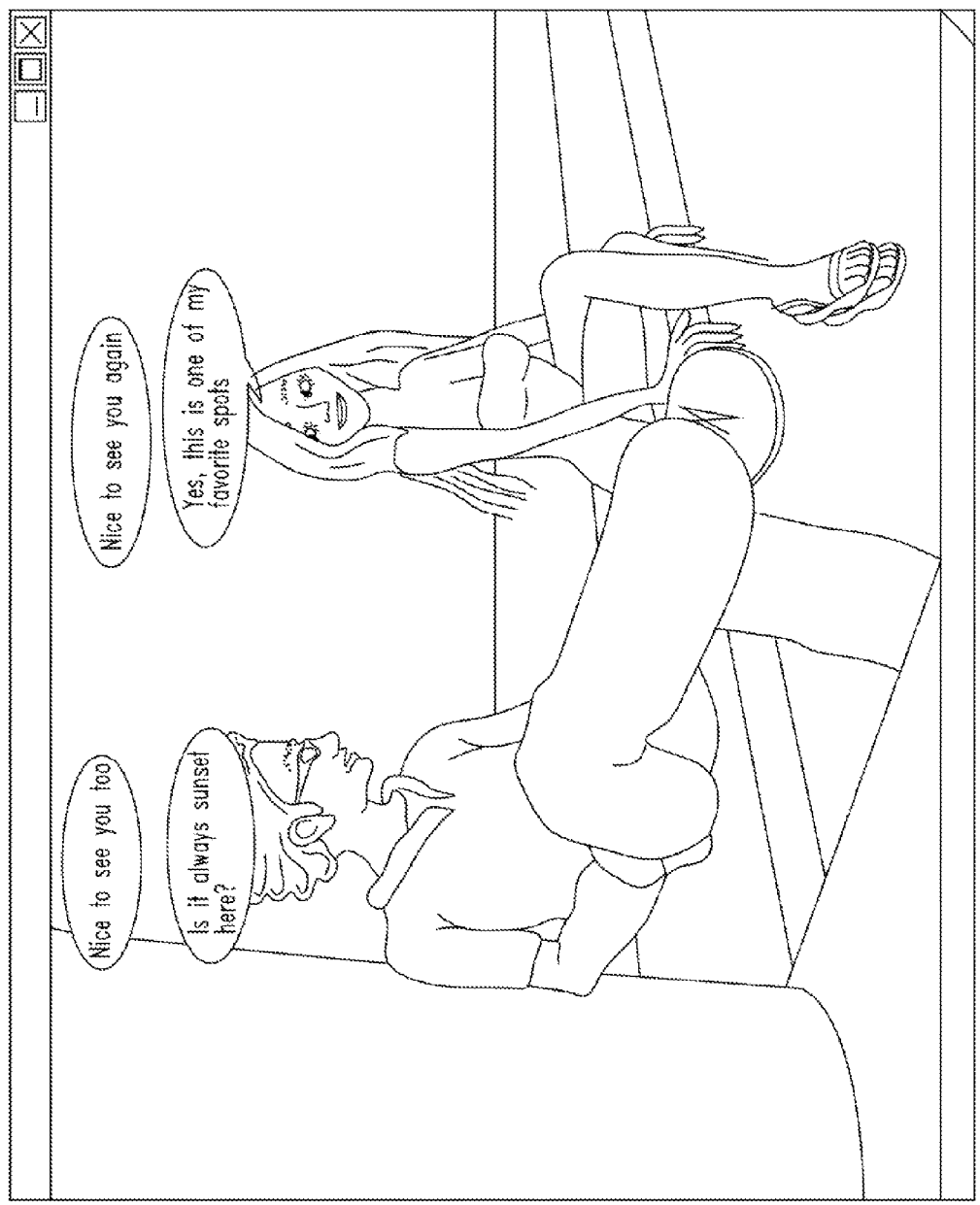
FIG. 1 illustrates a conversation in a 3D avatar-based environment, with chat messages framed as chat bubbles and participants framed as avatars.

FIG. 1 shows a conversation in a 3D avatar-based environment, with chat messages framed as chat bubbles and participants framed as avatars in a conventional system.

Figure 2:
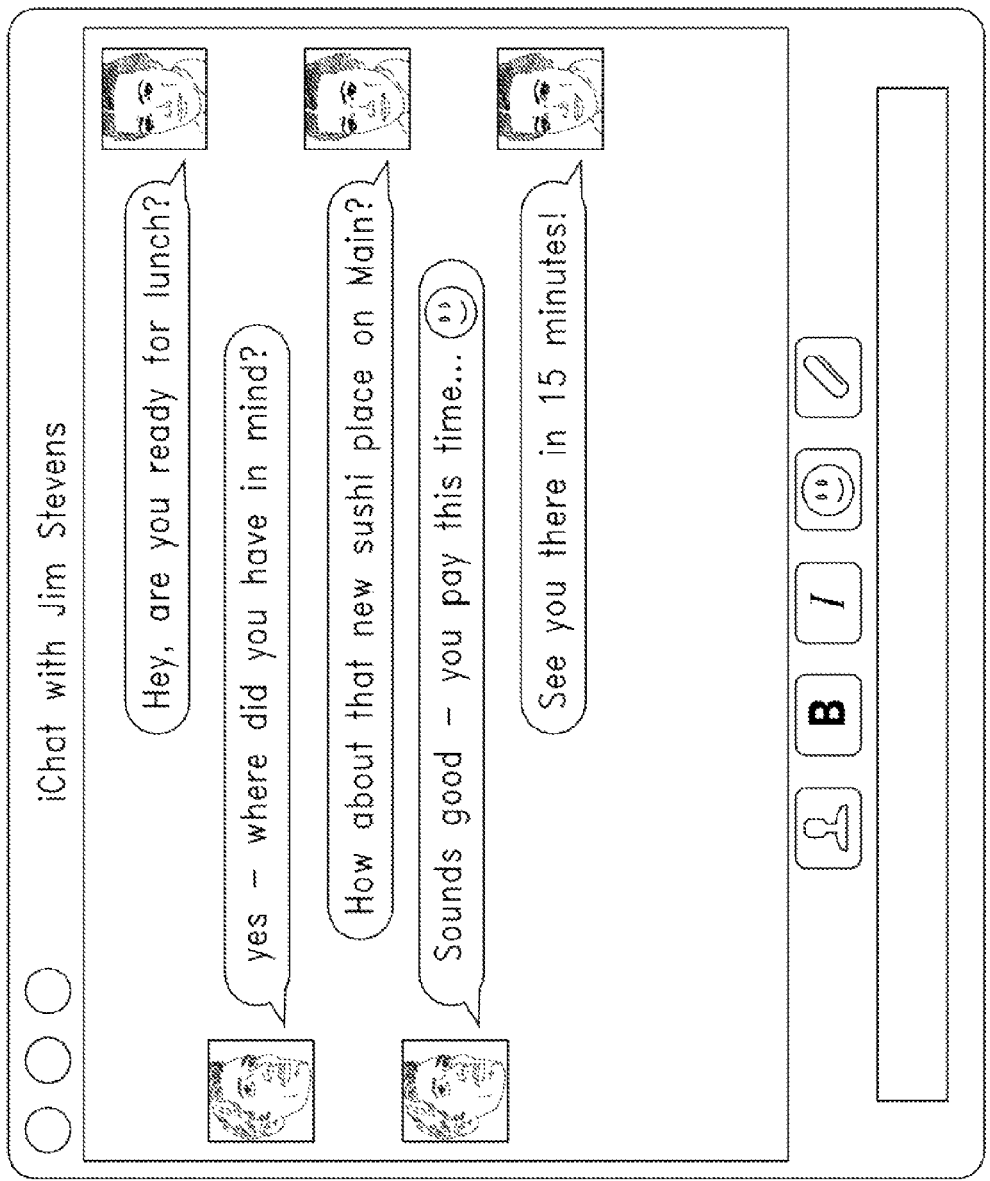
FIG. 2 illustrates a conversation in a 2D chat-based environment, with chat messages framed as chat, bubbles, and participants framed as small 2D images.

FIG. 2 shows a conversation in a 2D chat-based environment, with chat messages framed as chat bubbles, and participants framed as small 2D images in a conventional system, "Emoticons," short textual representations of emotional or situational intent, are translated to small 2D images.

FIG. 3 shows a conversation in a 2D asynchronous messaging environment, with chat messages framed as separate panels of text, and participants framed as small 2D images in a conventional system. "Emoticons" are transmitted verbatim, such as the sideways sad face shown in message 55m in FIG. 3. Users have to be trained to understand these textual-visual representations.

In a real personal interaction, the reactions and responses of the people involved are an important part of the communication. This part of real personal interaction is generally not captured well by the existing state of the art. Avatar-based communication systems, such as IMVU.com (IMVU is a trademark of IMVU, Inc.), have responded to this need by allowing participants to communicate animations in addition to emoticons. Such animations are immediately visible to all participants in the communications session; but, once played out, such animations are gone and not generally visible in the textual history of the communication. Additionally, such avatar-based communications only work when the interaction is synchronous.

The history of a textual conversation is generally displayed as a scrollable list of related messages. To refer to previous parts of the conversation, or previous conversations, the user reads the text. For systems that use avatar-based chat, this log does not capture the totality of the conversation, because avatars that were in the scene and may have animated during the chat, are doing something else at the time of review—or may no longer even be in the scene.

In the marketplace, the existing asynchronous mechanisms suffer from a lack of differentiation. Communications through one asynchronous text-based messaging system feels very similar in all the available products. This leads to a lack of ability with the systems operator to capture value from users of a system, other than trying to inject advertising or other similar external, extrinsic monetization, which may be resented by users.

Description of Various Example Embodiments

Figure 4:
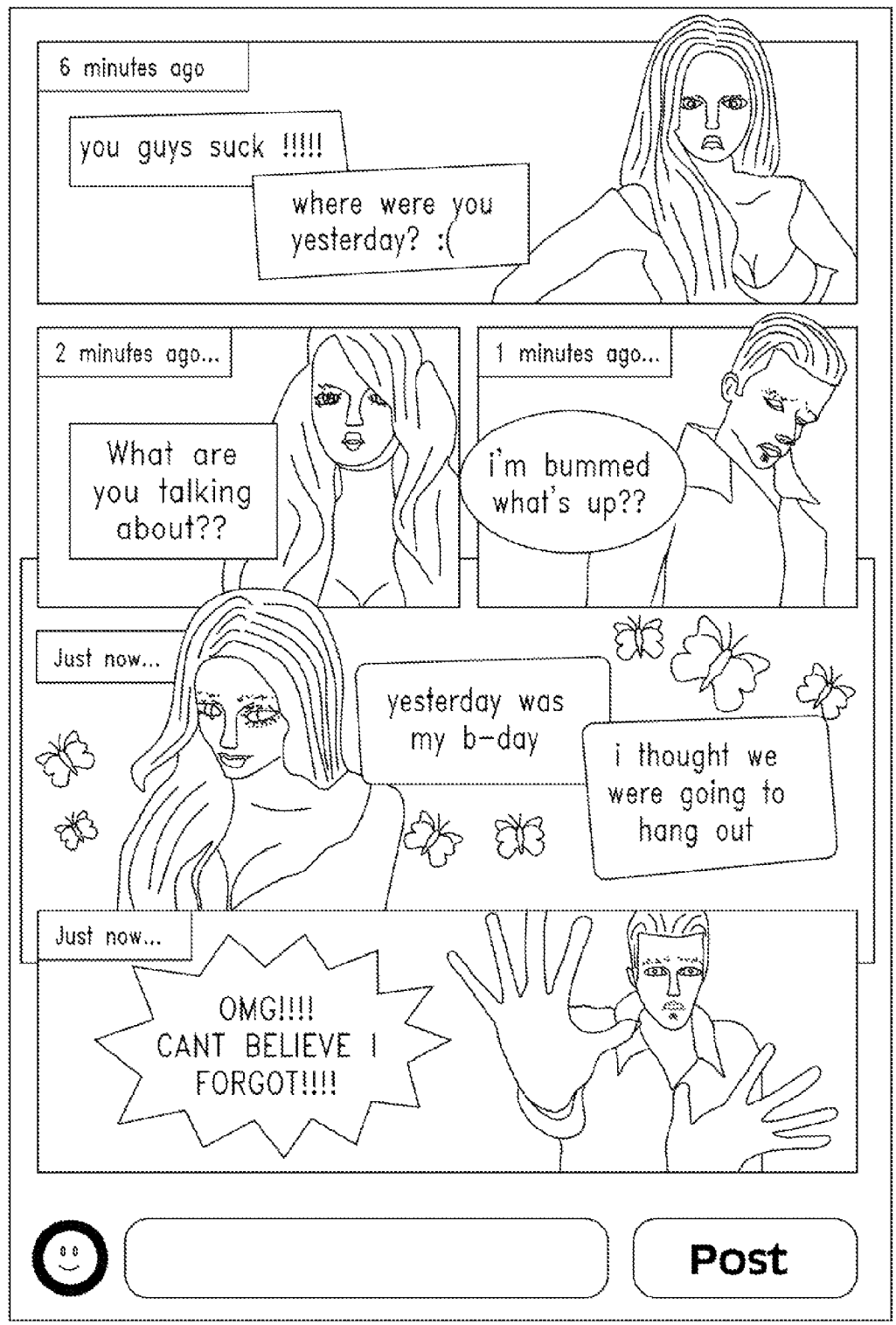
FIG. 4 illustrates an expressive/embellished conversation between three participants in an example embodiment.

An example embodiment is illustrated in FIG. 4, which depicts an expressive/embellished conversation between three participants. The conversation and images are composed by and displayed to conversation participants using any of various means of input (e.g., keyboard, stylus, speech recognition, joystick, mouse, touch sensitivity, screen keyboard, etc.) and any of various means of output, such as a display device (e.g., a liquid crystal display (LCD), a cathode ray tube (CRT) display, projector display, e-ink display, printer, etc.) The conversation can be framed by the message processing system of an example embodiment using comic book visual styles (e.g., a plurality of comic book-style panels) to draw upon a rich visual language of expression. A conversation between networked users can be broken down into a series of cells in which message panels display the message content conveyed between the networked users. As described in more detail below, a networked conversation can be embellished in a variety of ways to enhance the expressive intent, of the networked users and thereby create a more effective form of communication. Examples of framing methods available in the example embodiment include;
1. Floating frames/panels offset from the default flow
2. Text bubbles or message areas that have display baselines rotated from horizontal
3. Separating panels with whitespace
4. Using jagged or non-linear panel frames
5. Using gradients for panel separation
6. Using connecting lines, lightning rods, and animated elements to emphasize the flow of conversation
7. Using display panels of different sizes
8. Using avatar images representing participants in the conversation in panels
9. Animating avatar images as part, of the conversation
10. Animating the display and/or framing of text as part of the conversation
11. Using props, background/foreground elements, and images as part of the conversation
12. Animating props, background/foreground elements, and images as part of the conversation
13. Storing conversations, contexts, and media for playback remotely or locally on a display device for later review
14. Re-playing animations that were part of the conversation when participants review previews conversation history
15. Separating some elements using visual space to emphasize something that stands apart
16. Separating some elements using frames that overlap to emphasize things that are connected
17. Using visual elements that break outside the bounds of their container to emphasize action As described in more detail herein, the embellishments of messages and conversations includes the use of a wide variety of techniques for adding expressive elements to a message or a series of messages. These techniques, as described herein, include the use of avatars, animation, a plurality of comic book-style panels, display objects, shapes, textures, colors, shading, conceptual hints, visual styles, and other techniques for embellishing a message or a series of messages in a conversation with expressive elements. In one embodiment, messages and/or conversations can be embellished with 3D avatars with multiple animated elements, including various expressive backgrounds. In other embodiments, messages and/or conversations can be embellished by separating portions of the conversation into comic style panels, within which 3D avatars can be displayed and/or animations can be played.

Figure 5:
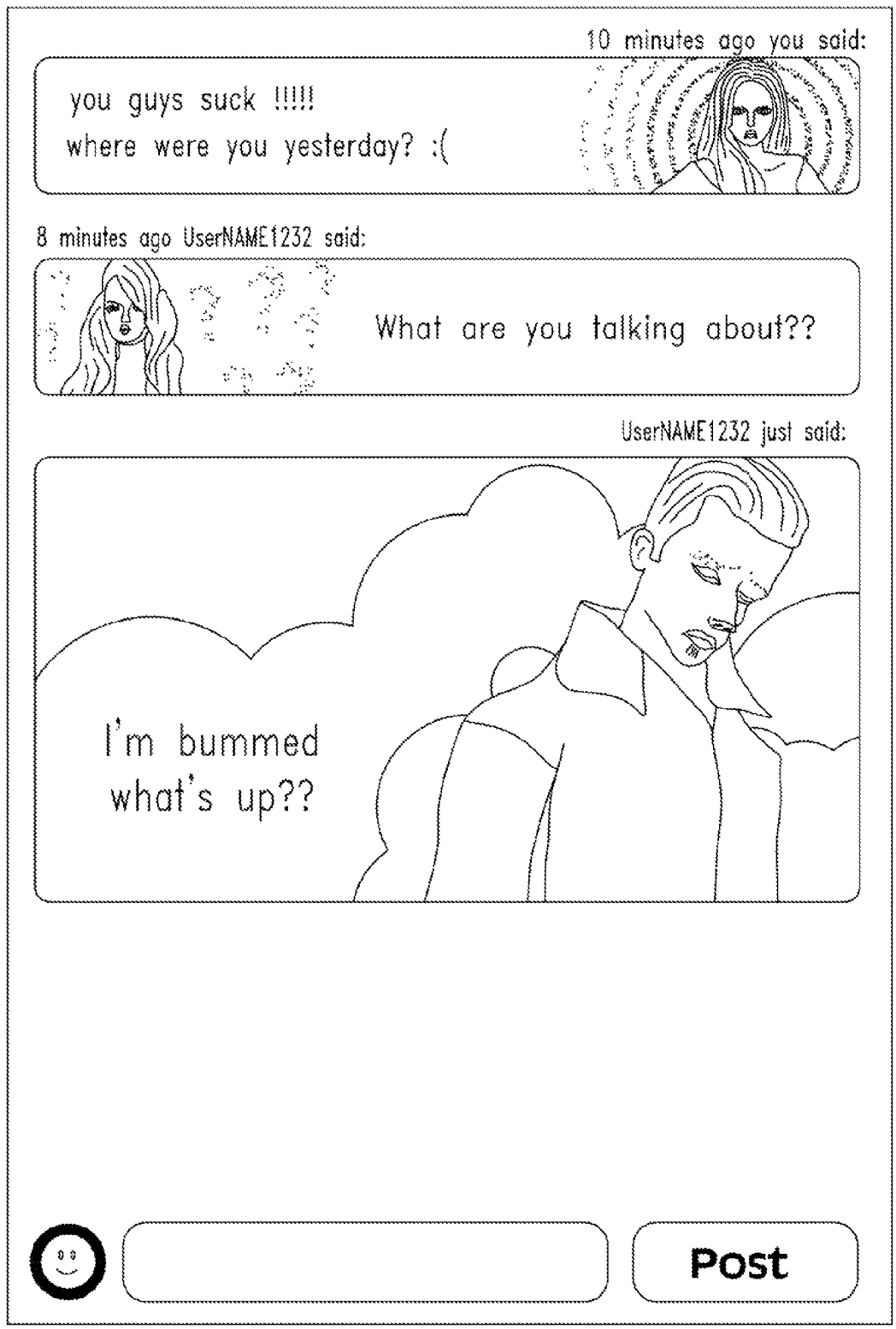
FIG. 5 illustrates an alternative embodiment using different visual, styles.

Referring now to FIG. 5, an illustrated alternative embodiment may use different visual styles. Each separate visual style may use a different set of conventions—for example, a cinematic movie based embodiment may use the conventions or conceptual hints of film noir, whereas a crayon-based, visual style may use conventions or conceptual hints of children's drawings. It is expected that some commercial offerings of the various embodiments may specialize in a particular convention to suit a specific market, and other offerings may provide a choice of conventions to the users.

For effect, embodiments may animate the old/existing panels and the new panel as the new panel is added to the conversation. The example embodiment uses top-to-down layout based on chronological ordering, with an older panel merging left-to-right in a single cell. Note that temporal information is provided in each cell. Other layouts may be chosen to support other writing styles (e.g., right-to-left, etc.) as well as other communication styles (e.g., back-to-front, ordered by different criteria such as sender, subject, visual cues, etc.)

As can be seen in the image shown in FIG. 4, the conversation history is structured with more recent entries in bigger panels, and entries that are temporally proximate overlap, whereas there is a more clear separation to older panels.

Figure 6:
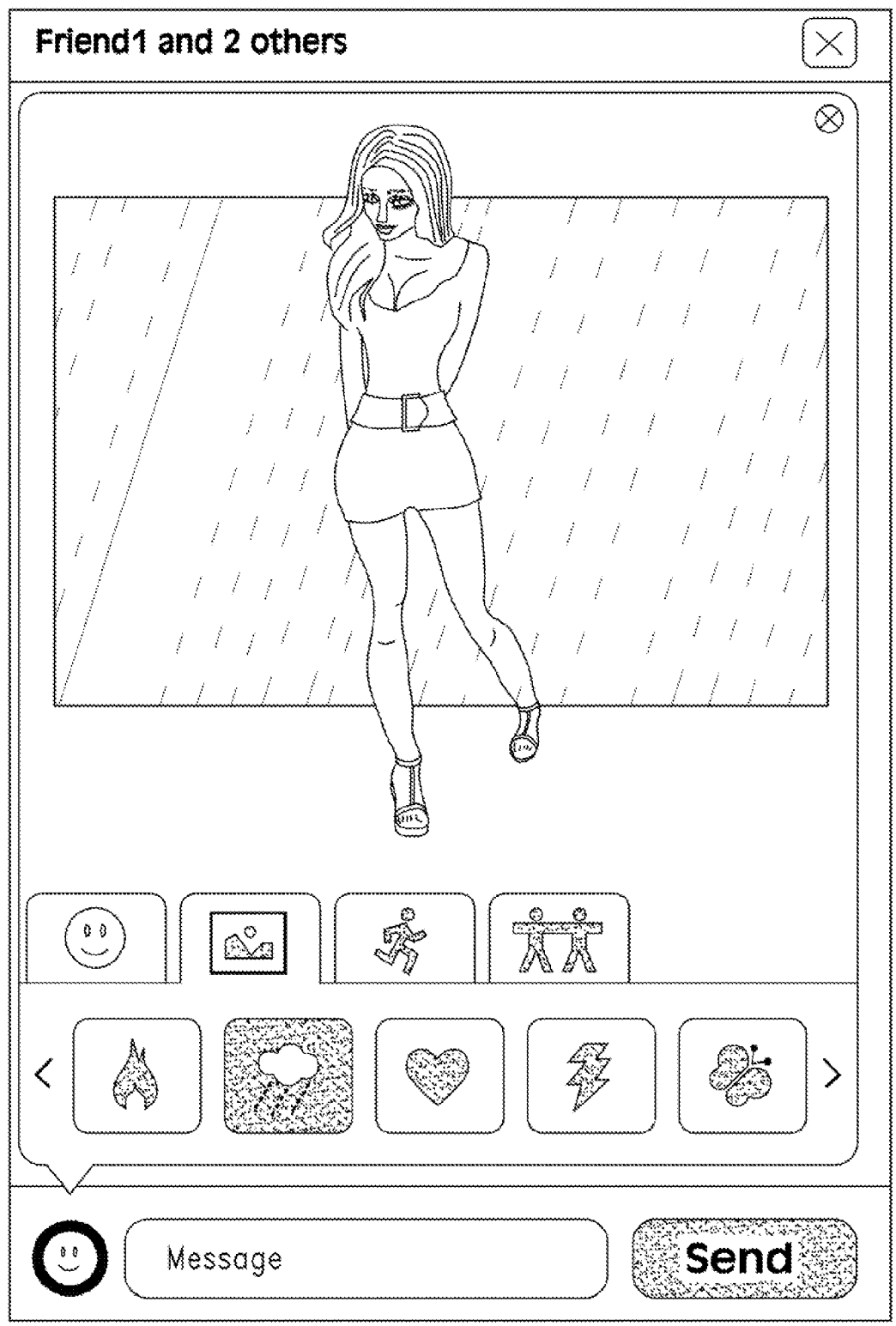
FIG. 6 illustrates the emoticon composition interface in an example embodiment.

Referring now to FIG. 6, the example embodiment illustrates a text box for entering messages, a button (e.g., "Send") to submit/post the message to the intended recipients, and a button (e.g., 'smiling face') to display an emoticon composition user interface having a set of controls to compose more expressive animations/emoticons.

In addition to manual composition of animation-based emoticons, the example embodiment can also extract meaning through analysis of the text in a current message and/or in a history of the message communications. For example, the text with all capital letters in a message can be displayed using a jagged outline to convey exclamatory intent as shown in FIG. 4.

Figure 7:
FIGS. 7 through 12 illustrate examples of animated emoticons available in various embodiments.
Figure 8:
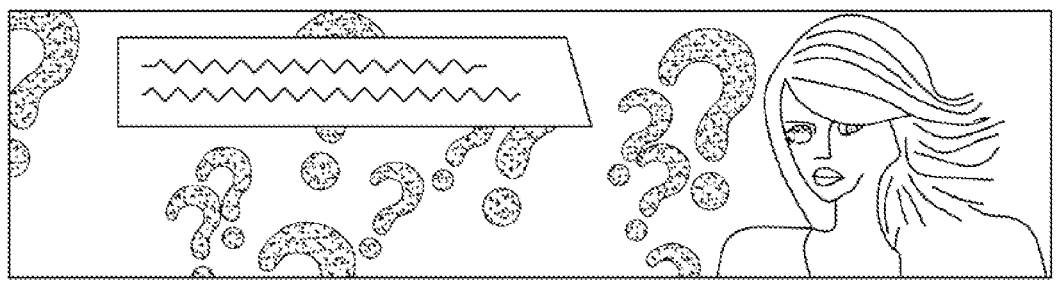
Figure 9:
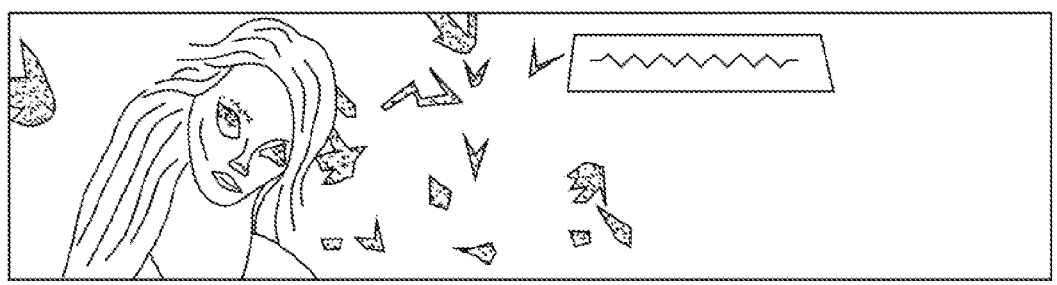
Figure 10:
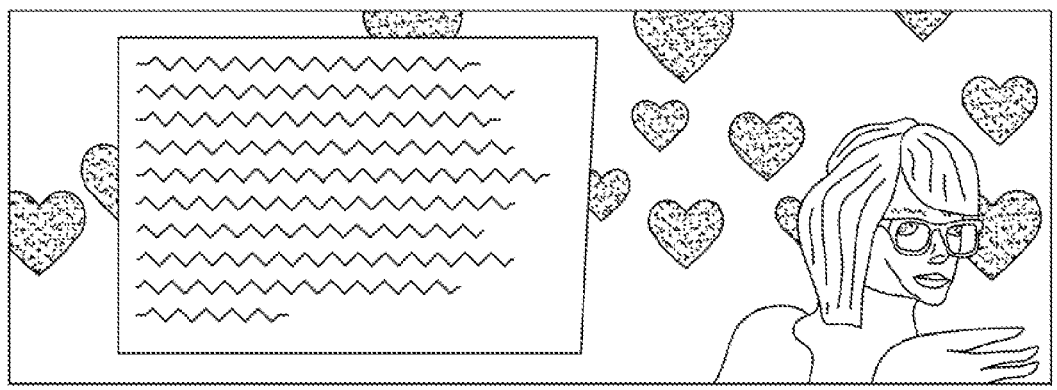
Figure 11:
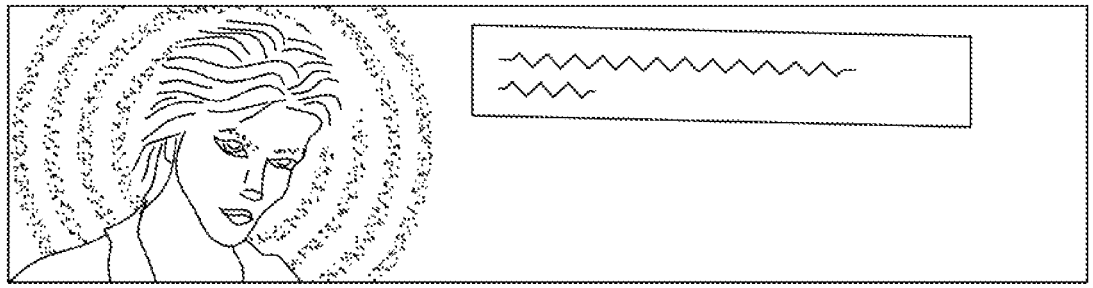
Figure 12:
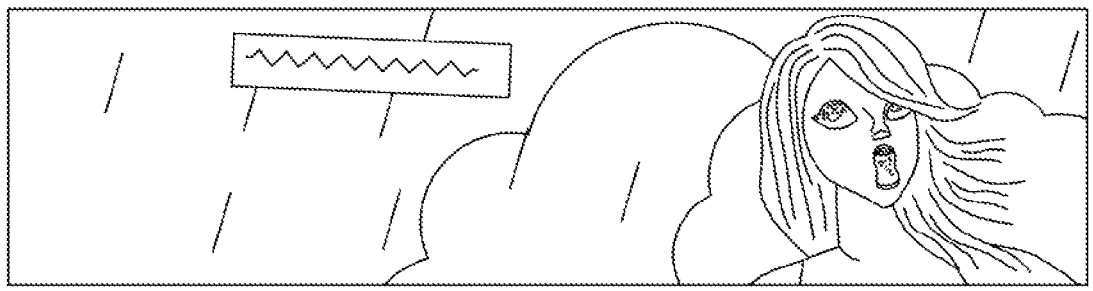

Referring now to FIGS. 7 through 12, the example embodiments illustrate examples of animated emoticons available in various embodiments. For example, FIG. 7 illustrates a "plain" un-adorned presentation image for illustration. FIG. 8 illustrates an animation of question marks emanating out from the conversation participant, first exploding out and then floating gently out and up. FIG. 9 illustrates three-dimensional (3D) objects (e.g., butterflies) flying out from and interacting with the participant avatar. FIG. 10 shows a background of hearts adding emotion to the entire display scene, rather than focusing entirely on the participant avatar. FIG. 11 shows concentric circles radiating out behind the participant avatar for emphasis (a common comic book convention taken to interactive, online animation.) FIG. 12 shows modifying the entire scene to add drama. For example, the background changes to one of clouds, there is 3D rain added to the scene elements, and the avatar animates with an expression of shock. In each of these examples, various forms of message embellishments or conversation embellishments are used to convey expressive elements of the communication between users.

Referring again to FIG. 6, the hearts, clouds, and butterflies displayed in FIGS. 9, 10, and 12 map to corresponding buttons along the bottom row of the set of controls of the emoticon composition user interface shown in FIG. 6. The circles and question marks displayed in FIGS. 8 and 11 map to corresponding buttons found on other pages/tabs of the emoticon composition interface.

The example embodiment provides a mechanism (e.g., the compose message processing component 12 described in more detail below) for participants to discover and purchase additional modes of expression while composing a message. These modes may be as simple as a design for text display, or as complex as a complete scene change, complete with animated 3D objects, sound effects, and interaction between participating avatars. These modes of expression may be provided by the operator/provider of the message processing system, or may be provided by other third parties (e.g., User-Generated Content), where such third parties may be users of an embodiment of the message processing system described herein. Purchasing may be made with appropriate value, including but not limited to, real-world money, earned points or credits, micro-currencies, social reputation points, bonus and rewards, redeemable tokens, credits cards, debit cards, check, SMS payment, home phone payment, pre-paid cards, and any other mode of payment transaction.

Figure 13:
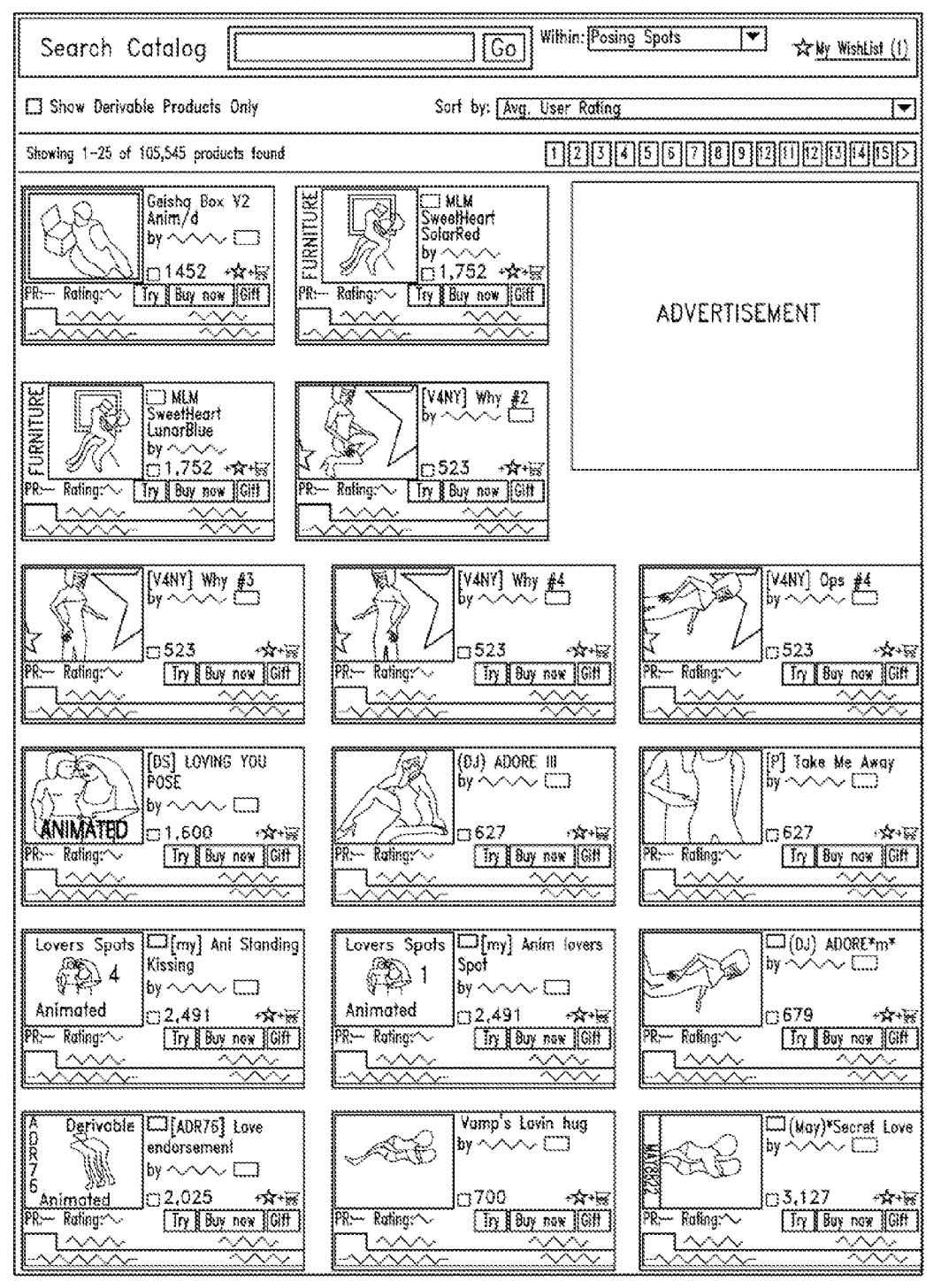

FIG. 13 illustrates, an example of an online catalog listing avatar actions or items provided by the compose message processing component 12 described below. Any of the actions or items listed in the catalog can be selected for sampling or purchase using well-known user interface input mechanisms. For each action or item listed in the catalog, a user can try the action or item, buy the action or item, or gift the action or item for use by another user. The purchased action or item can be incorporated into an expressive/embellished message (e.g., using the embellish message processing component 14 described in more detail below).

As described above, an example embodiment is configured to add expressive elements to messages or a series of messages (e.g., conversations) as embellishments of messages or conversations. These embellishments can include, among a variety of embellishment techniques described herein, processing a series of messages to generate a corresponding plurality of comic book-style panels, which embellish the original conversation. As part of this process, an example embodiment can be configured to receive a series of messages (e.g., a conversation) via a network from one or more other users. The received messages can be conventional text chat messages, instant messages, email messages, Twitter tweets, social network or blog postings, transcribed voice messages, and/or any of a variety of messages produced by standard text messaging systems. The received messages can be also be conventional text documents, files, news articles, transcribed interviews, and the like. In general, virtually any type of textual data can be used as a source of the messages provided as an input to the various embodiments described herein.

In a typical example, the received messages can be conventional text chat messages conveyed between at least two users via a conventional network. The series of messages conveyed between the two users can be considered a conversation. As well-known in conventional text messaging systems, it can be difficult to capture the intent, mood, tone, emotion, inflection, or subtle meaning of a conversation by use of mere text. As described above, some users have employed the use of emoticons to attempt to capture the subtleties of a conversation. But these techniques can be crude and sometimes annoying.

The various embodiments disclosed herein can embellish a conversation by converting a series of messages into a corresponding set of comic book-style panels in a panel layout, which add expressive elements to a conversation and thereby improve communication between the two users. In one embodiment, a user who is sending a message (e.g., a sending user) can select from a variety of panel layout selections, which convey various types of moods. For example, see FIGS. 7 through 12. In another embodiment, the messaging system of an example embodiment can analyze the message text generated by the sending user (or other source of textual data) and automatically select an appropriate panel layout from the available set of panel layout options without the need for an explicit user selection of a panel layout. The message text itself can provide clues that allow the messaging system to select an appropriate panel layout. For example, a text message presented in the form of a question can cause the automatic selection of a panel layout related to a question (e.g., see FIG. 8). In another example, a text message presented with various keywords (e.g., 'sad', 'depressed', etc.) can cause the automatic selection of a panel layout related to a sad or dramatic mood (e.g., see FIG. 12). In another example, a text message presented with various keywords (e.g., 'love', 'romance', etc.) can cause the automatic selection of a panel layout related to a romantic mood (e.g., see FIG. 10). In yet another example, a text message presented with various active verbs (e.g., 'shout', 'cry', etc.) can cause the automatic selection of a panel layout related to an active response (e.g., see FIG. 11). Additionally, other cues in the text message itself can be indicative of a particular panel layout selection, such as capitalization, punctuation, emoticons, repeated phrases, etc. Using these techniques, the various embodiments can either explicitly (e.g., user-selected) or implicitly (e.g., automatically selected based on message content) select a panel layout that corresponds to the received message. In this manner, an example embodiment can decide on an initial panel layout for the display of a newly received message. Once the panel layout for the received message is selected as described above, the text of the received message can be integrated into an instance of a panel with the selected panel layout thereby producing a message panel. The message panel for the newly received message can be added to previously generated message panels of a related conversation between one or more users according to the panel layout (e.g., see FIG. 4). The panel layout can be used to determine how the various message panels of a conversation fit together. For example, the panel layout can define a layout wherein message panels are separated with whitespace, the use of jagged or non-linear panel frames, the use of gradients for panel separation, the use of connecting lines, lightning rods, animated elements and/or avatars to emphasize the flow of conversation, displaying panels of different sizes, and the like. Other panel layout techniques are described above. In each case, the message panel layout can be used to embellish the conversation between two or more users.

As each message of a conversation is received, the messaging system of an example embodiment can process the newly received message to add embellishments to the messages and to the conversation as described above. In each case, the messaging system can select an appropriate message panel for a message and an appropriate panel layout for a conversation using the explicit or implicit methods as described above. In some cases, the newly received message may change the tone of a conversation, which may make a change necessary to the message panel selections or panel layout of previous messages. Therefore, an example embodiment compares the panel layout selection for a current message with the panel layout selections made for previous messages of a conversation. In this manner, the example embodiment determines a relationship between the current message and previous messages. Similarly, the example embodiment determines a relationship between the currently selected panel layout and previously used panel layouts. Based on this comparison between a current message and previous messages and between the currently selected panel layout and previously used panel layouts, the example embodiment can modify the currently selected panel, layout to select a different panel, layout that may more closely match the tone reflected in the current message. Similarly, the example embodiment can modify a previously used, panel layout to select a different panel layout for the previous message that may more closely match the tone reflected in the current message. In this case, the previous message is re-displayed, in a message panel corresponding to the newly selected different panel layout.

These techniques for selecting a panel layout and subsequently modifying the panel layout are beneficial for a variety of reasons. For example, the initial few messages of a conversation can be separated into separate panels with white space in between the panels to increase communication clarity in the conversation. This separation of messages into separate panels can represent one type of panel layout. However, as the quantity of messages in the conversation increases, it becomes beneficial to collapse multiple vertical message panels into a horizontal strip of shorter overlapping message panels to collapse the history of the conversation and conserve display area. This collapsing of messages into overlapping message panels can represent a second type of panel layout. A third type of message panel layout can be used to display an embellished conversation in which message panels interact with each other or objects displayed in the message panels interact with each other. In each case, the messaging system of an example embodiment can generate embellished messages and embellished conversations in a a plurality of comic book-style panels in a variety of ways.

In a particular embodiment, the messaging system can: receive, via a network, a first message from another user as part of a conversation including a plurality of messages; determine an initial panel layout for display of the first message; and display the first message separated into a panel corresponding to the initial panel layout.

The particular embodiment of the messaging system can also: receive, via a network, a second message from another user as part of the conversation; determine a relationship between the first message and the second message; select a panel layout for the second message based at least in part on the relationship between the first message and the second message; and display the second message in a panel corresponding to the selected panel layout.

The particular embodiment of the messaging system can also: receive, via a network, a second message from another user as part of the conversation; determine a relationship between the first message and the second message; select a panel layout based at least in part on the relationship between the first message and the second message; display the second message in a message panel corresponding to the selected panel layout; and re-display the first message in a message panel corresponding to the selected panel layout.

Once messages are composed and/or embellished as described herein, the transmission of the messages in a conversation between participants in the example embodiment can be implemented using any underlying communications medium, including but not limited to SMS, MMS, online forums or bulletin boards, email, real-time communications systems such as IRC, Instant Messenger, telephone, video conversations, existing electronic discussion systems, speech-to-text and text-to-speech systems, and embedded conversations in other activities, such as games. "Transmission" as used herein may mean either the sending of a message to intended destinations, or receiving messages from a source. The transmit message processing component 16, described in more detail below, manages the transmission of expressive/embellished messages in the example embodiment.

Additionally, in addition to presenting real-time conversations and presenting asynchronous conversations, the example embodiment merges conversations through synchronous and asynchronous means into one stream per context, where context, can correspond to the recipient, sender, subject, time, transmission mode, venue, physical location, user-defined, groupings or filterings, and other criteria.

In an example embodiment of the message processing system as described herein, several processes can be used to compose, embellish, and deliver a message with increased clarity and expressiveness. Additionally, several other processes can be used to receive, display, and browse messages with embellished properties. These processes in an example embodiment are listed and described below:

1. The process of selecting recipients and/or context for the message/s (see FIG. 14)

2. The process of composing messages (see FIG. 15 and the Compose Message Processing component 12 shown, in FIGS. 22 and 23)
3. The process of embellishing messages (see FIG. 16 and the Embellish Message Processing component 14 shown in FIGS. 22 and 23)
4. The process of transmitting, storing, and forwarding messages to recipient's (see FIG. 17 and the Transmit Message Processing component 16 shown in FIGS. 22 and 23)
5. The process of receiving messages (see FIG. 18 and the Receive Message Processing component 17 shown in FIGS. 22 and 23)
6. The process of displaying received messages (see FIG. 19 and the Display Message Processing component 18 shown in FIGS. 22 and 23) in context, of other messages (see FIG. 20)
7. The process of browsing and (re-)reviewing messages (see FIG. 21 and the Browse Message Processing component 22 shown in FIGS. 22 and 23)

Note that the sequence of user actions in time can vary from the sequence specified above. For example, a message may be composed before recipients are chosen.

Messages can be transmitted through a variety of channels as mentioned above. Some of those channels may be "embellishment capable," meaning that the channels can carry information about user embellishments with rich fidelity. Examples include extended Extensible Mark-up Language (XML) elements in Extensible Messaging and Presence Protocol (XMPP) transports, using Java Script Object Notation (JSON) or Javascript encoding for additional data in Hypertext Markup Language (HTML) display, or using attachments to e-mail messages or Multipurpose Internet Mail Extensions (MIME)/multipart encoding for carrying embellishment information.

When messages are transmitted to a channel that is not embellishment-aware, embellishments to messages are "down-converted" to traditional text representations. For example, an animation of flying hearts may be converted to the text emoticon "<3" and an animation of a grinning avatar may be converted to the text emoticon ":-D" This way, some of the emotion of the original message is conveyed even though the full richness is lost.

When messages are received without embellishment information, embellishments can be added on the receiving side in a process analogous to the reverse of the "down-converting" of embellishments. This makes messages more impactful when viewed through this particular communication mechanism than when viewed in a traditional text medium, even though the full richness of embellishments is not present.

The example embodiment can be implemented as a sequence of instructions stored on a communications device containing a central processing unit with a connection to a display, as well as a mechanism of Input. In variants of the example embodiment, input consists of a touch-screen with an available on-screen keyboard, and a traditional Personal Computer (PC) keyboard and mouse interface. The example embodiment can be configured to transmit and receive communications through third-party communication channels such as Google Talk or Twitter. The example embodiment can also be configured to transmit and receive communications through a communication channel with knowledge about the embellishment or expressive data, built on top of a message system as described in U.S. patent application Ser. No. 13/019,505, filed on Feb. 2, 2011 or U.S. Pat. No. 7,995,064 filed by the same applicant as the present application.

In the example embodiments described below, a user/participant can select a set of message recipients and compose a message including explicitly user-selected message embellishments and/or system-provided or automatically generated message embellishments. When a user has completed the configuration of an embellished message, the participant can press the "Send" or "Post" button to submit the message to the message processing system for further processing.

Figure 14:
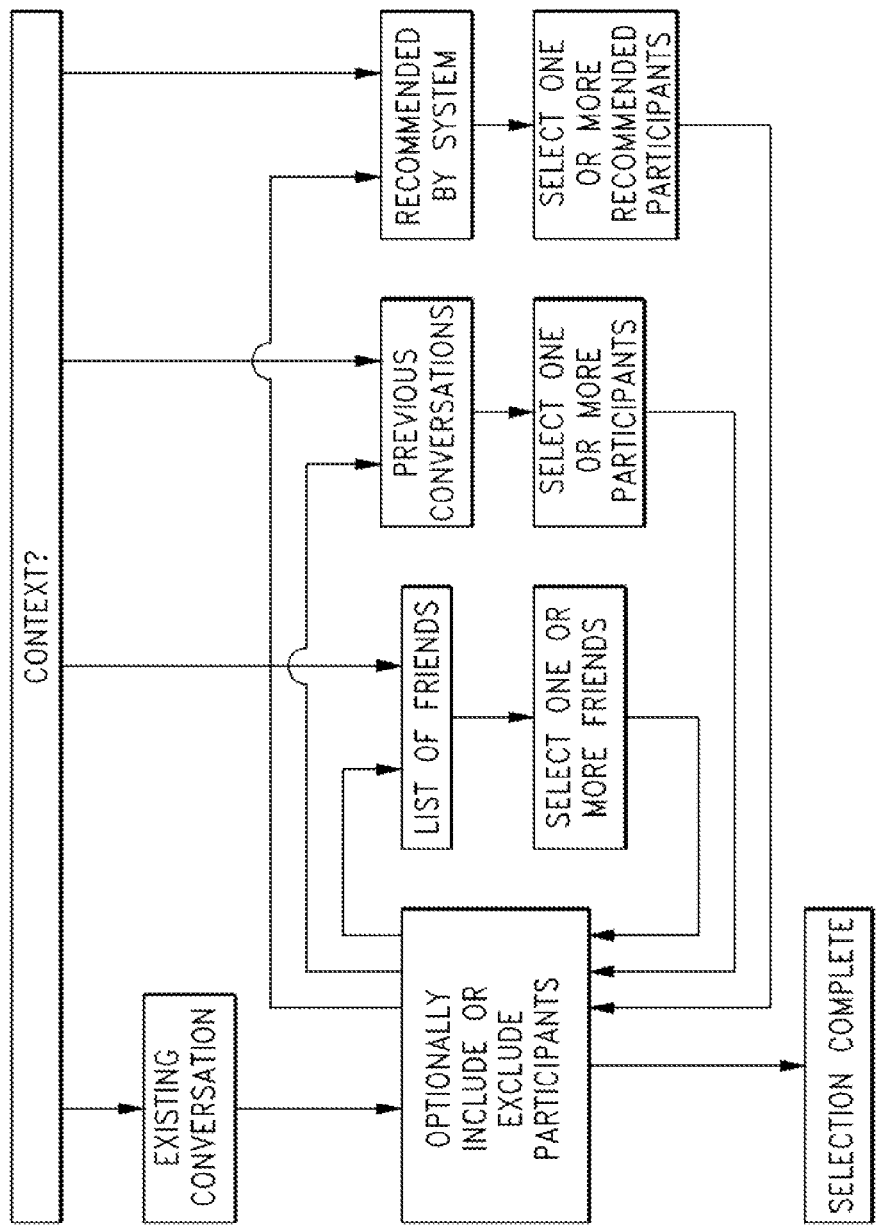
FIG. 14 illustrates the process of selecting recipients and/or context for the message's in an example embodiment.

Referring to FIG. 14, the process of selecting recipients and/or context for the message/s in an example embodiment is illustrated.

Figure 15:
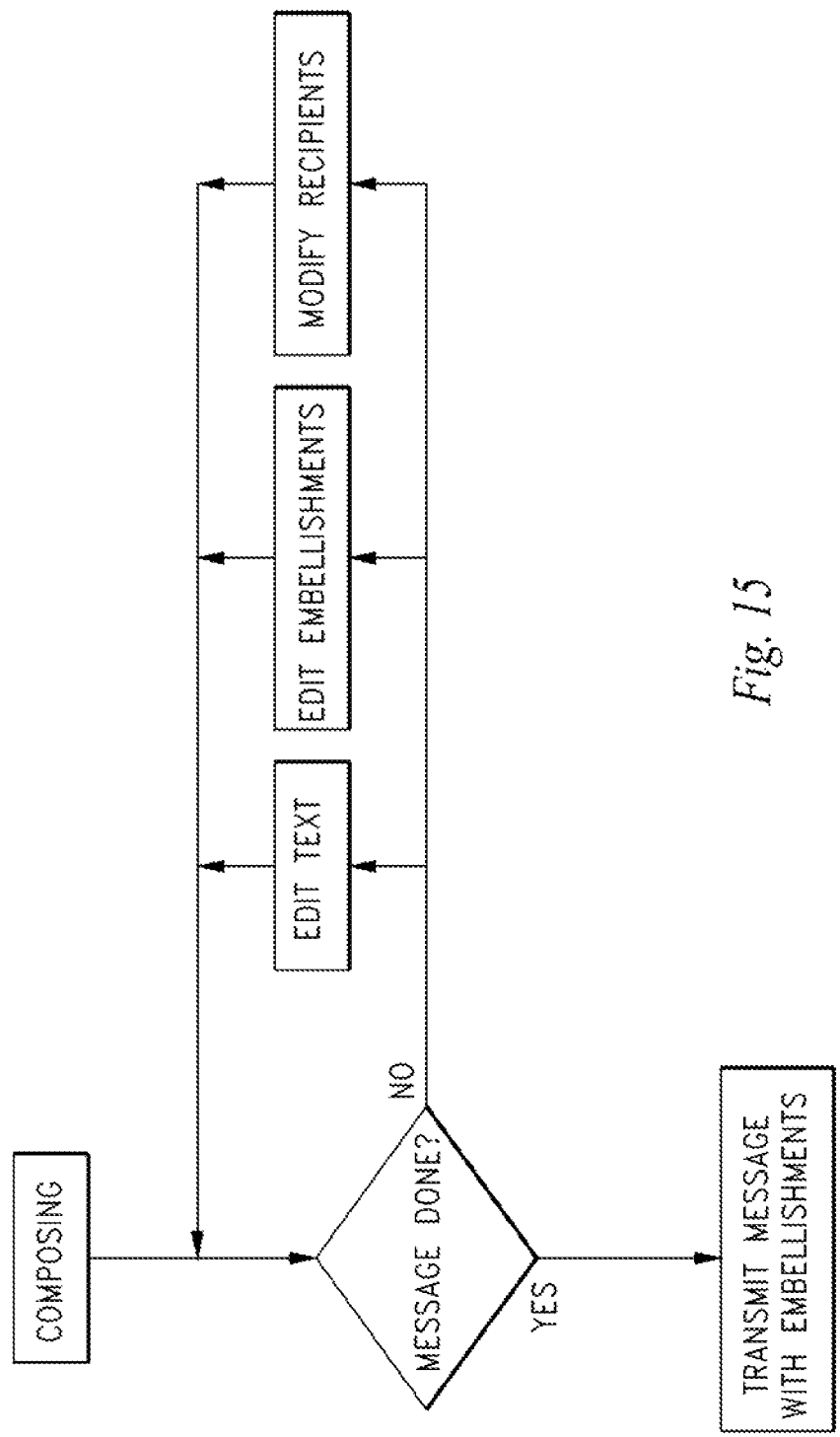
FIG. 15 illustrates the process of composing messages in an example embodiment.

Referring to FIG. 15, the process of composing messages in an example embodiment is illustrated.

Figure 16:
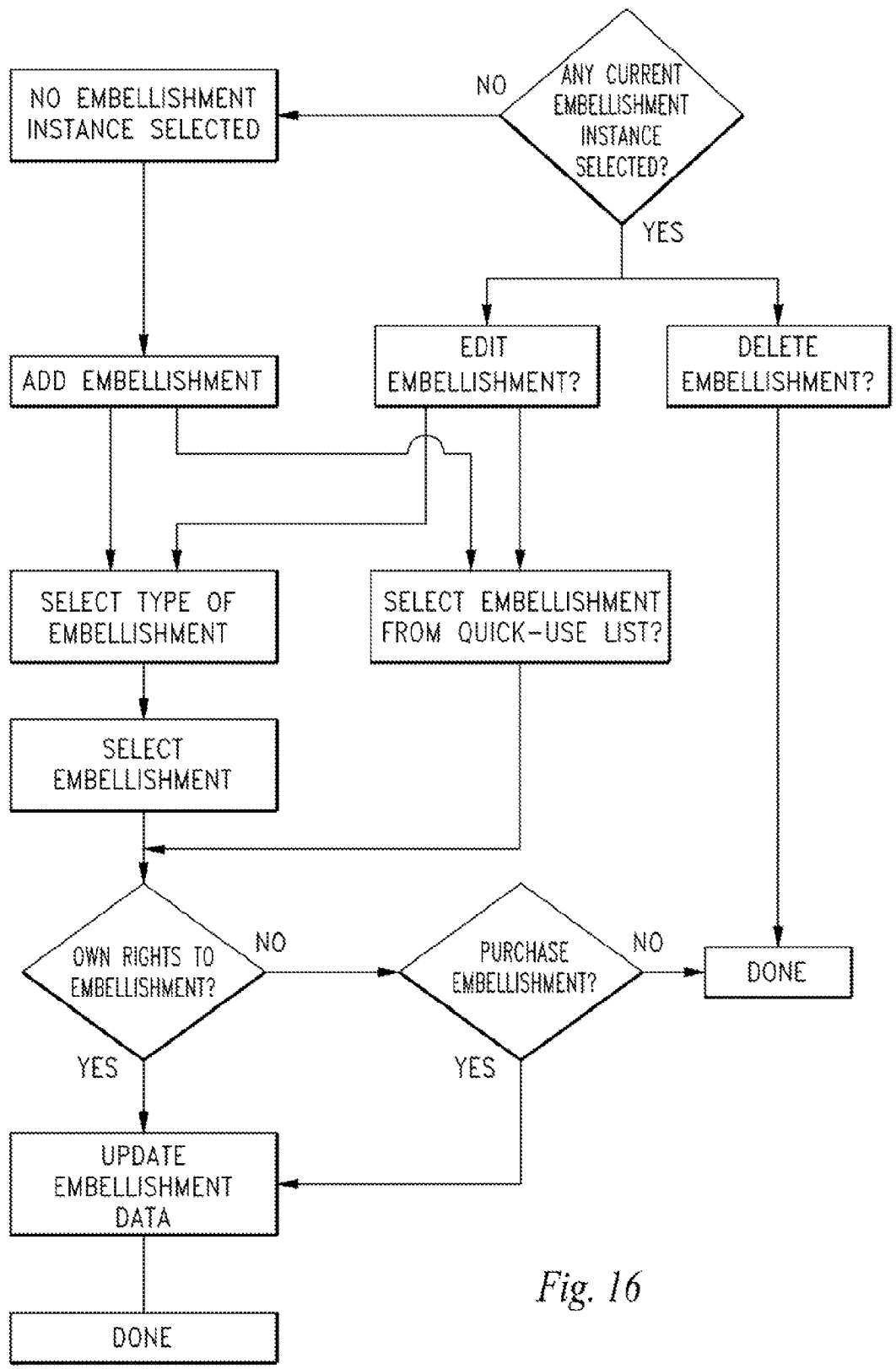
FIG. 16 illustrates the process of embellishing messages in an example embodiment.

Referring to FIG. 16, the process of embellishing messages in an example embodiment is illustrated.

Figure 17:
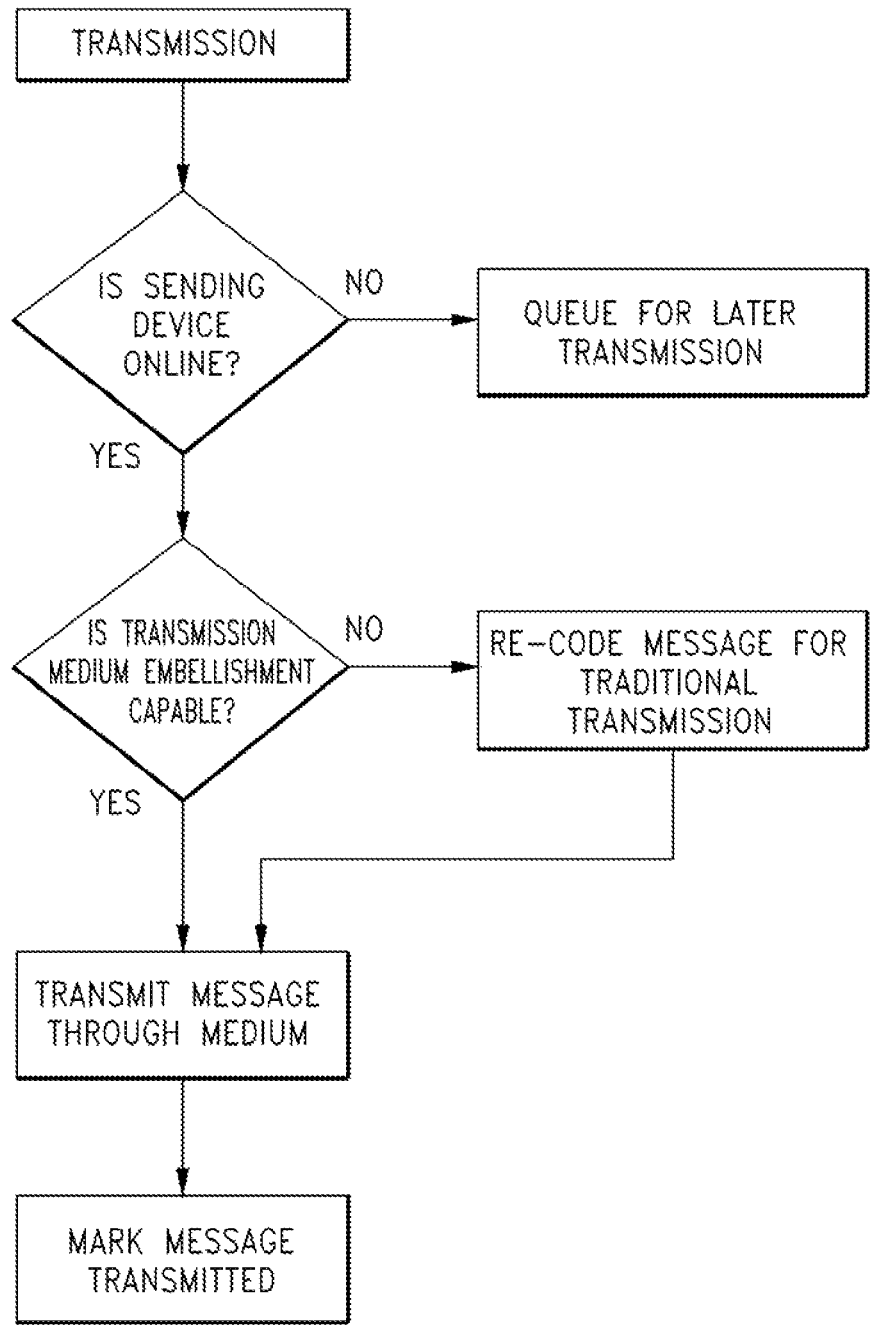
FIG. 17 illustrates the process of transmitting, storing, and forwarding messages to recipient/s in an example embodiment.

Referring to FIG. 17, the process of transmitting, storing, and forwarding messages to recipient/s in an example embodiment is illustrated.

Figure 18:
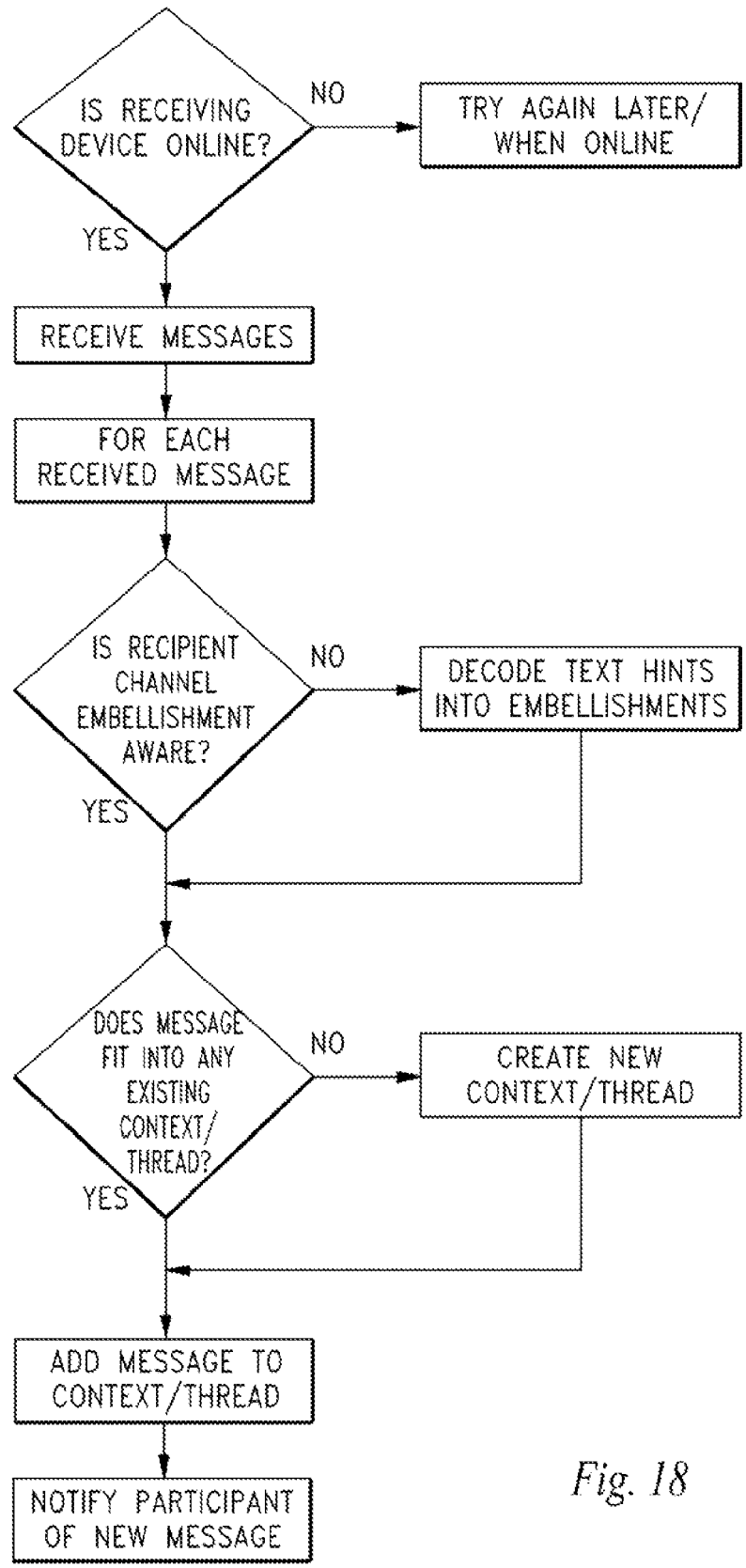
FIG. 18 illustrates the process of receiving messages in an example embodiment.

Referring to FIG. 18, the process of receiving messages in an example embodiment is illustrated.

Figure 19:
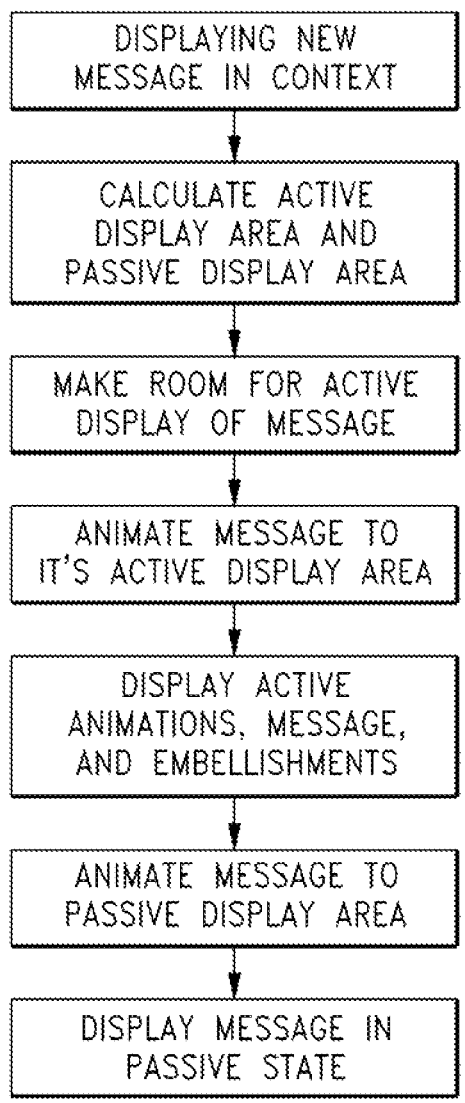
FIGS. 19 and 20 illustrate the process of displaying received messages in the context of other messages in an example embodiment.
Figure 20:
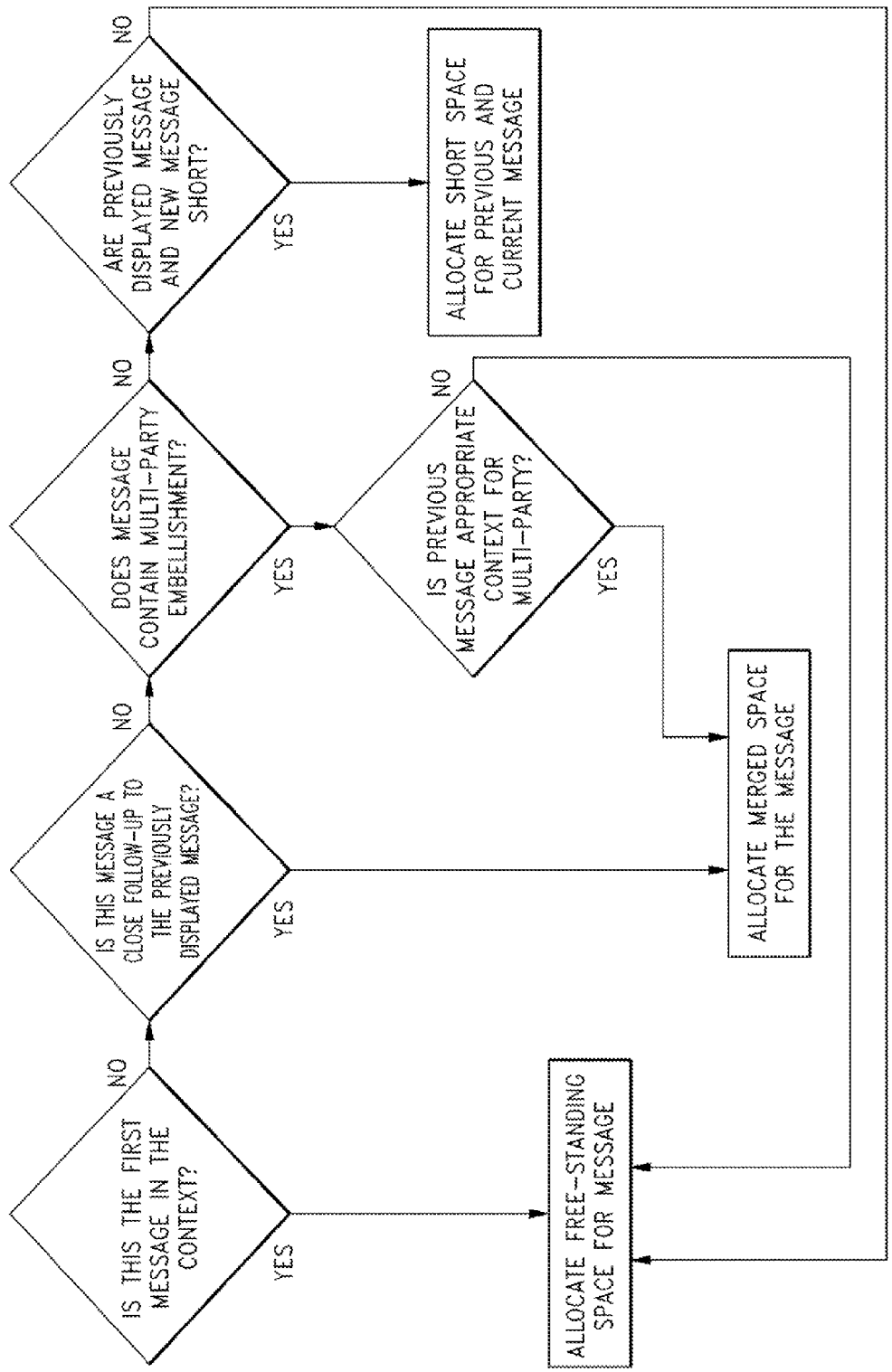

Referring to FIGS. 19 and 20, the process of displaying received messages (see FIG. 19) in the context of other messages (see FIG. 20) in an example embodiment is illustrated.

Figure 21:
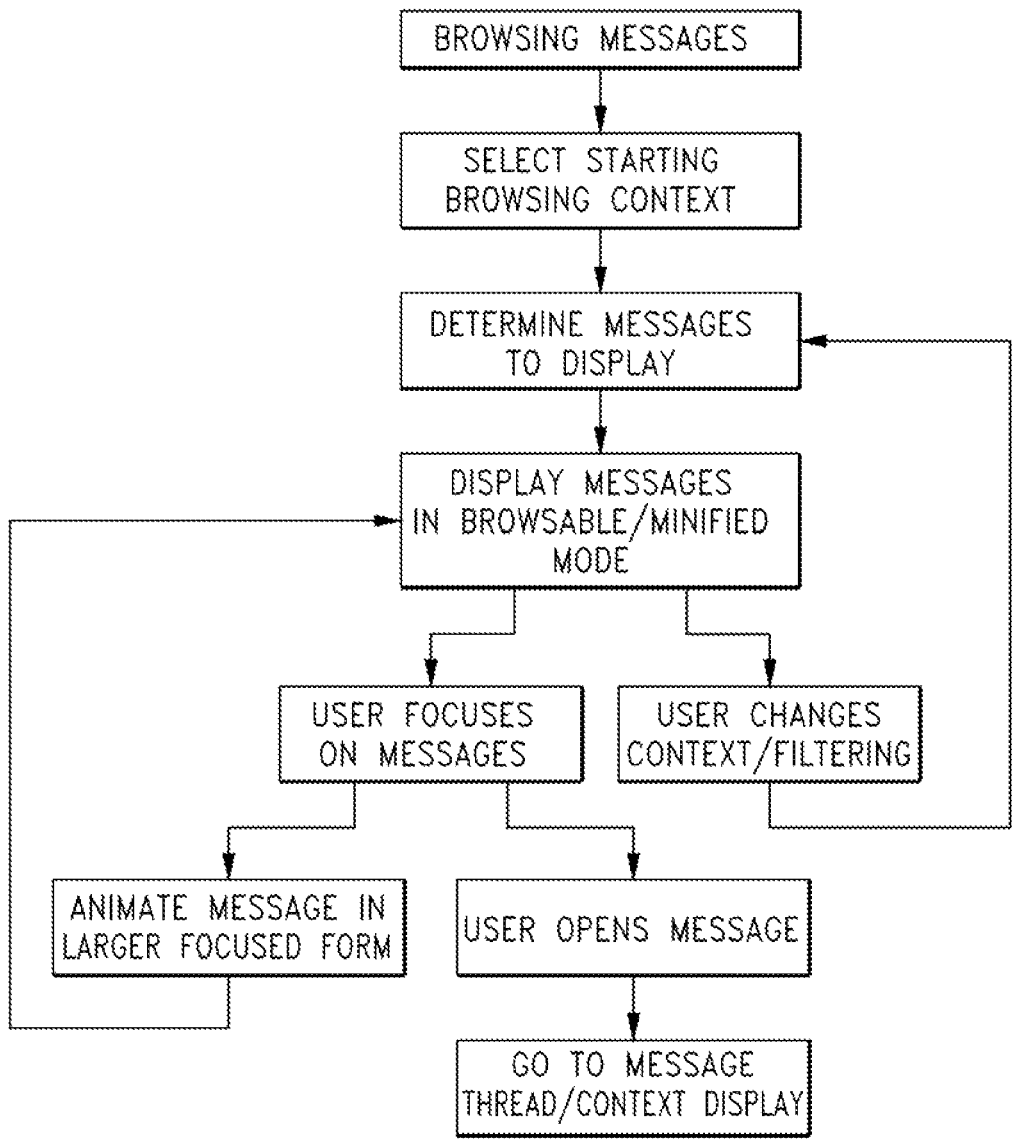
FIG. 21 illustrates the process of browsing and (re-) reviewing messages in an example embodiment.

Referring to FIG. 21, the process of browsing and (re-)reviewing messages in an example embodiment is illustrated.

In the example embodiments described herein, embellishments are represented as references to rich data separately available on a computer network. References can go several levels deep, and may make use of a proportional-compensation mechanism for e-commerce, such as the system and method described in U.S. Pat. No. 7,912,793, filed by the same applicant as the present application.

The display device can store some needed data for embellishment display locally, and can fetch other needed components from a remote storage system. That remote storage system may use information about the request, such as the requesting user, the message being viewed, and the specific assets, to make a determination on whether the requested asset should be transmitted to the user, or whether that request should be denied, for example because of non-payment or regulatory compliance. Embellishments consist of one set of data stored on such systems and distributed to viewable clients (called "embellishment data,") and another set of data, called "configuration data," that is actually transmitted with the message through the embellishment-aware transmission channel. Properties that can be configured for the embellishment may include such values as start time, duration, target avatar, flight path of effects, colors to use, speed, volume, and inclusion/exclusion of specific components of the embellishment.

The embellishment data contains information about which configuration parameters are available for the particular embellishment. Once a message with one or more embellishments has been composed and transmitted, the receiving display device additionally makes use of (e.g., decodes) the description of the embellishment data to display the embellishment in different modes as shown in the flow charts illustrated in FIGS. 19 and 20.

Examples of embellishment data include references to specific texture images, specific mesh data, specific animation data including but not limited to position, orientation, scale, and shape of geometric objects in the displayed scene/panel, sound effects, timing information, as well as groupings of elements that may be configured or included/excluded in the transmitted embellishment. An additional piece of data in the embellishment data is information about how to translate the embellishment to text-mode representation, and how to recognize an instance of the embellishment and certain configuration data in received text-mode messages. For example, a flying-hearts embellishment may contain instructions that the presence of the text-mode emoticon. "<3" instantiates this embellishment for display, and that the number of such emoticons found in a particular message modulates the "number of hearts" configuration data of the embellishment.

Other examples of embellishment data include whether to change the mood of the sending or receiving avatar elements of the display panel. For example, the "sad" embellishment may instruct the display device to apply a "sad face" and "hanging head" animation to the sending user representation avatar.

Thus, as described above, the various embodiments can convert a non-embellished message into an embellished message. Similarly, the various embodiments can convert an embellished message into a non-embellished message. As a result, the various embodiments can receive message streams from a variety of sources (e.g., Twitter) and apply or modify embellishments as needed to convert the message to a format compatible with a particular output mode. For output systems capable of supporting fully embellished messages (e.g., animation, avatars, texture graphics, etc.), the various embodiments can process the received message in any form to produce a fully embellished message. As described above, the fully embellished message adds communication elements and nuances not available in conventional text messages. Nevertheless, for output systems not capable of or not configured for supporting fully embellished messages, the various embodiments can process the received message in any form to produce a non-embellished message, while still trying to convey the meaning of the embellishments but using non-embellished messaging techniques as described above.

The various embodiments as described herein provide several advantages, improvements, and benefits over the conventional technologies. A few of these advantages are listed below;

- The various embodiments described herein can use the same presentation form for either synchronous or asynchronous chat.
- The various embodiments described herein can represent participants using customizable 3D avatars.
- The various embodiments described herein can represent emotion using animations in the context of the particular message.
- The various embodiments described herein can provide intrinsic monetization opportunities that are integral (as opposed to external) to the experience.
- The various embodiments described herein allow subsequent review of animation-based emoticons and participants in the original context.
- The various embodiments described herein can structure conversation history in a manner that frames the situation of the communication.

It will be apparent to those of ordinary skill in the art that the various embodiments as described herein can provide other advantages, improvements, and benefits over the conventional technologies.

Figure 22:
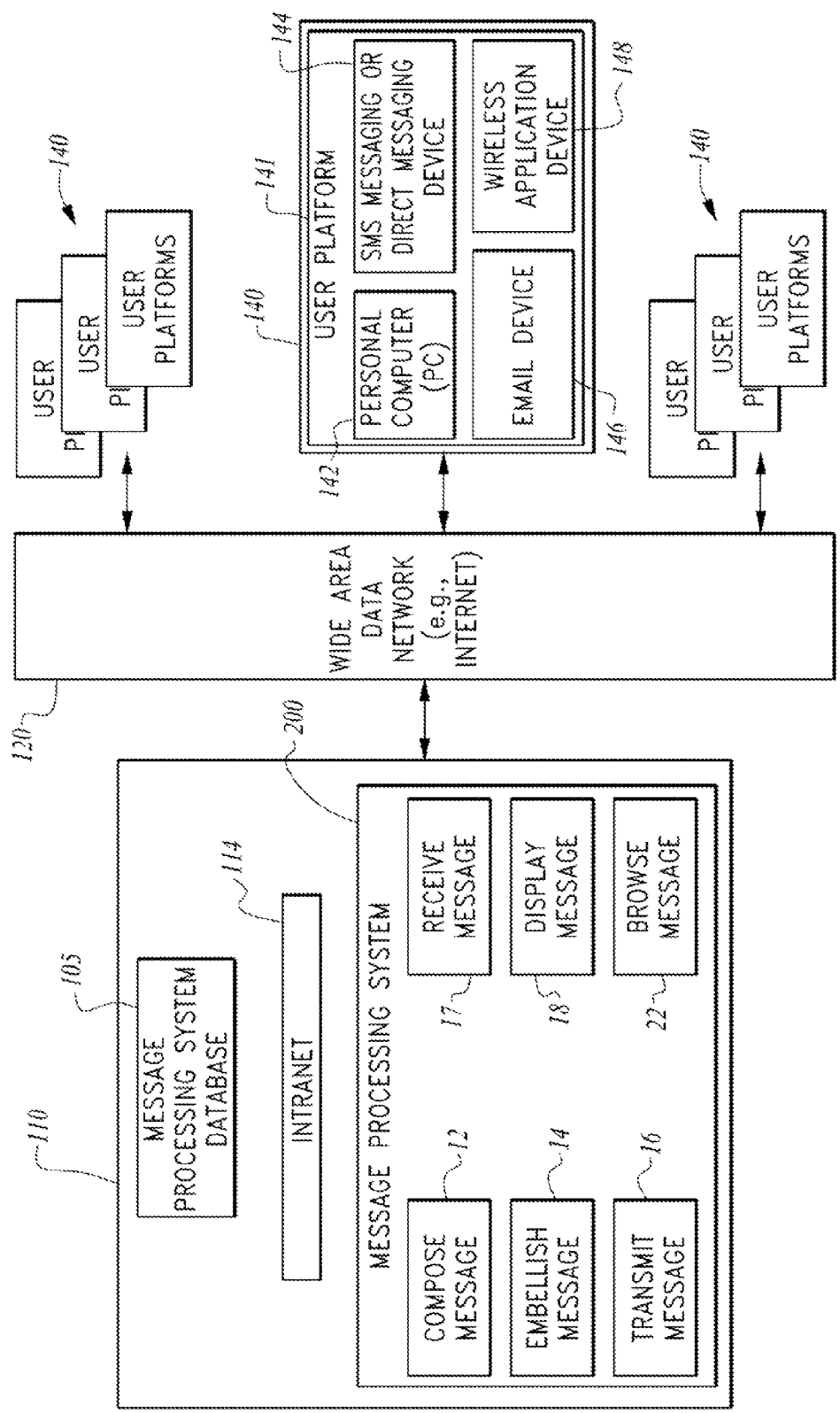
FIG. 22 illustrates an example embodiment of a system and method for increasing clarity and expressiveness in network communications.

Referring now to FIG. 22, in an example embodiment, a system and method for increasing clarity and expressiveness in network communications are disclosed. In various example embodiments, an application or service, typically operating on a host site (e.g., a website) 110, is provided to simplify and facilitate synchronous or asynchronous message and state transfers between a plurality of users at user platforms 140 from the host site 110. The host, site 110 can thereby be considered a message processing system site 110 as described herein. Multiple user platforms 140 provide a plurality of message streams of which a user may become a content consumer and/or a content provider. The message processing system site 110 and the user platforms 140 may communicate and transfer messages, related content, and information via a wide area data network (e.g., the Internet) 120. Various components of the message processing system site 110 can also communicate internally via a conventional intranet or local area network (LAN) 114.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through a universal serial bits (USB) port, other forms of computer-readable media, or any combination thereof. On an interconnected set of LANs, including those based on differing architectures and protocols, a router acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital User/Subscriber Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks. Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly.

Networks 120 and 114 may further employ a plurality of access technologies including 2nd (2G), 2.5, 3rd (3G), 4th (4G) generation radio access for cellular systems, wireless local area network (WLAN), Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, LTE, UWB, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The user platforms 140 may include any of a variety of providers of network transportable digital content. Typically, the file format that is employed is XML, however, the various embodiments are not so limited, and other file formats may be used. For example, feed formats other than HTML/XML or formats other than open/standard feed formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein. Syndicated content includes, but is not limited to such content as news feeds, events listings, news stories, blog content, headlines, project updates, excerpts from discussion forums, business or government information, and the like. As used, throughout this application, including the claims, the term "feed," sometimes called a channel, refers to any mechanism that enables content access from a user platform 140.

In a particular embodiment, a user platform 140 with one or more client devices 141 enables a user to access content from other user platforms 140 via the message processing system site 110 and network 120. Client devices 141 may include virtually any computing device that is configured to send and receive information over a network, such as network 120. Such client devices 141 may include portable devices 144 or 146 such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, set-top boxes, and the like. As such, client devices 141 may range widely in terms of capabilities and features. For example, a client device configured, as a cell phone may have a numeric keypad and a few lines of monochrome LCD display on which, only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, Extensible HTML (xHTML), Compact HTML (CHTML), and the like, to display and send a message.

Client devices 141 may also include at least one client application that is configured to receive content or messages from another computing device via a network transmission. The client application may include a capability to provide and receive textual content, graphical content, video content, audio content, alerts, messages, notifications, and the like. Moreover, client devices 141 may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Client devices 141 may also include a wireless application device 148 on which a client application is configured to enable a user of the device to subscribe to at least one message source. Such subscription enables the user at user platform 140 to receive through the client, device 141 at least a portion of the message content. Such content may include, but is not limited, to, instant messages, Twitter tweets, posts, stock feeds, news articles, personal advertisements, shopping list prices, images, search results, blogs, sports, weather reports, or the like. Moreover, the content may be provided to client devices 141 using any of a variety of delivery mechanisms, including IM, SMS, Twitter, Facebook, MMS, IRC, EMS, audio messages, HTML, email, or another messaging application. In a particular embodiment, the application executable code used for content subscription as described herein can itself be downloaded to the wireless application device 148 via network 120.

In some cases, a user at user platform 140 can subscribe to certain content and/or content channels provided by all mechanisms available on the client device(s) 141. In various embodiments described herein, the host site 110 can employ processed information to deliver content channel information to the user using a variety of delivery mechanisms. For example, content channel information can be delivered to a user via email, Short Message Service (SMS), wireless applications, and direct messaging (e.g., Twitter) to name a few. Additionally, content channel information can be provided to a user in response to a request from the user.

Referring still to FIG. 22, host site 110 of an example embodiment is shown to include a message processing system 200, intranet 114, and message processing system database 105. Message processing system 200 can also include a Compose Message Processing component 12, an Embellish Message Processing component 14, a Transmit Message Processing component 16, a Receive Message Processing component 17, a Display Message Processing component 18, and a Browse Message Processing component 22. Each of these modules can be implemented as software components executing within an executable environment of message processing system 200 operating on host site 110. Each of these modules of an example embodiment is described in more detail above in connection with the figures provided herein.

Figure 23:
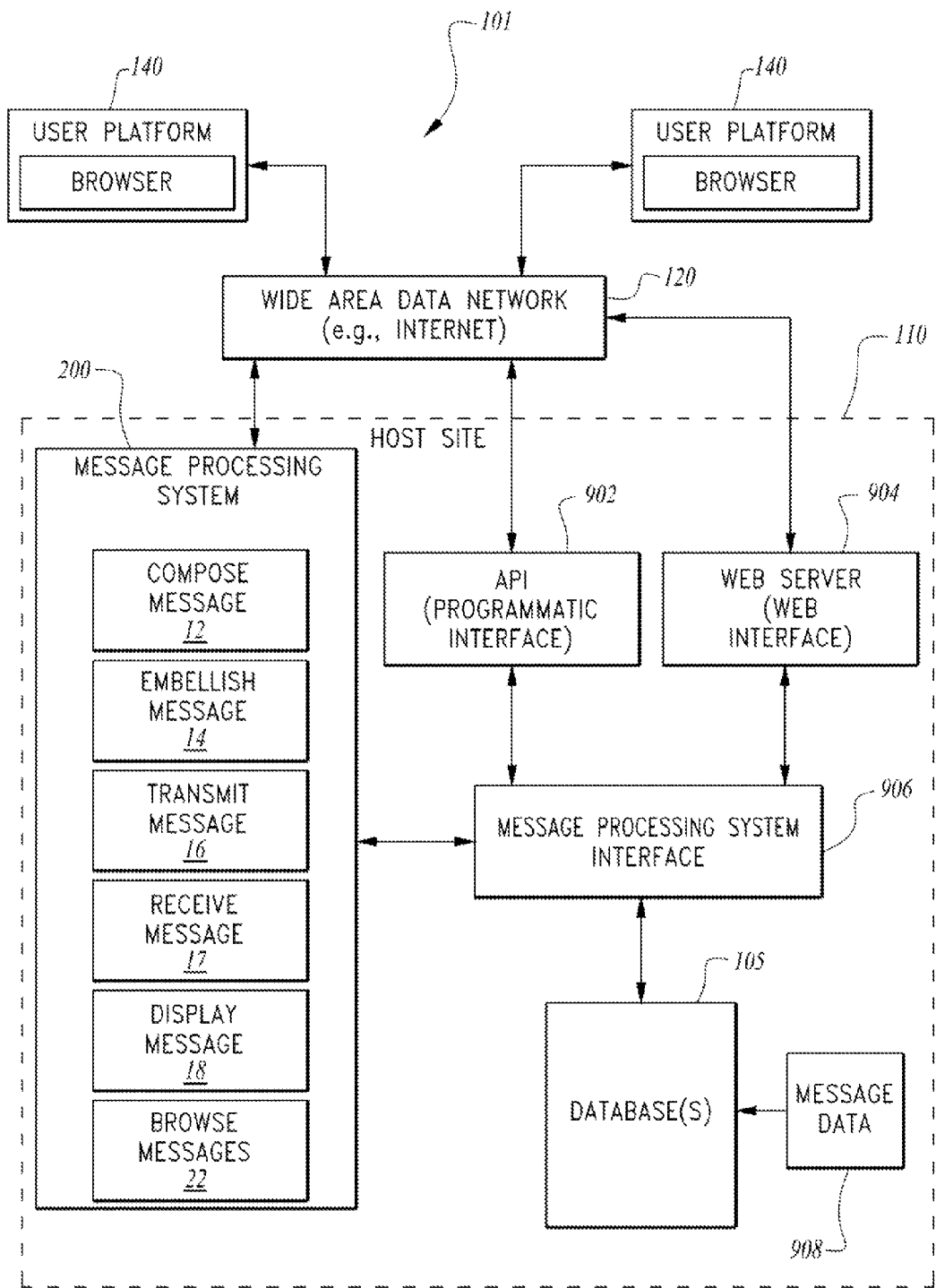
FIG. 23 illustrates another example embodiment of a networked system in which various embodiments may operate.

Referring now to FIG. 23, another example embodiment 101 of a networked system in which various embodiments may operate is illustrated, in the embodiment illustrated, the host site 110 is shown to include the message processing system 200. The message processing system 200 is shown to include the functional components 12 through 22 as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the message processing system 200 either directly or via an interface 906. The message processing system 200 may be configured to access a data storage device 105 either directly or via the interface 906.

Figure 24:
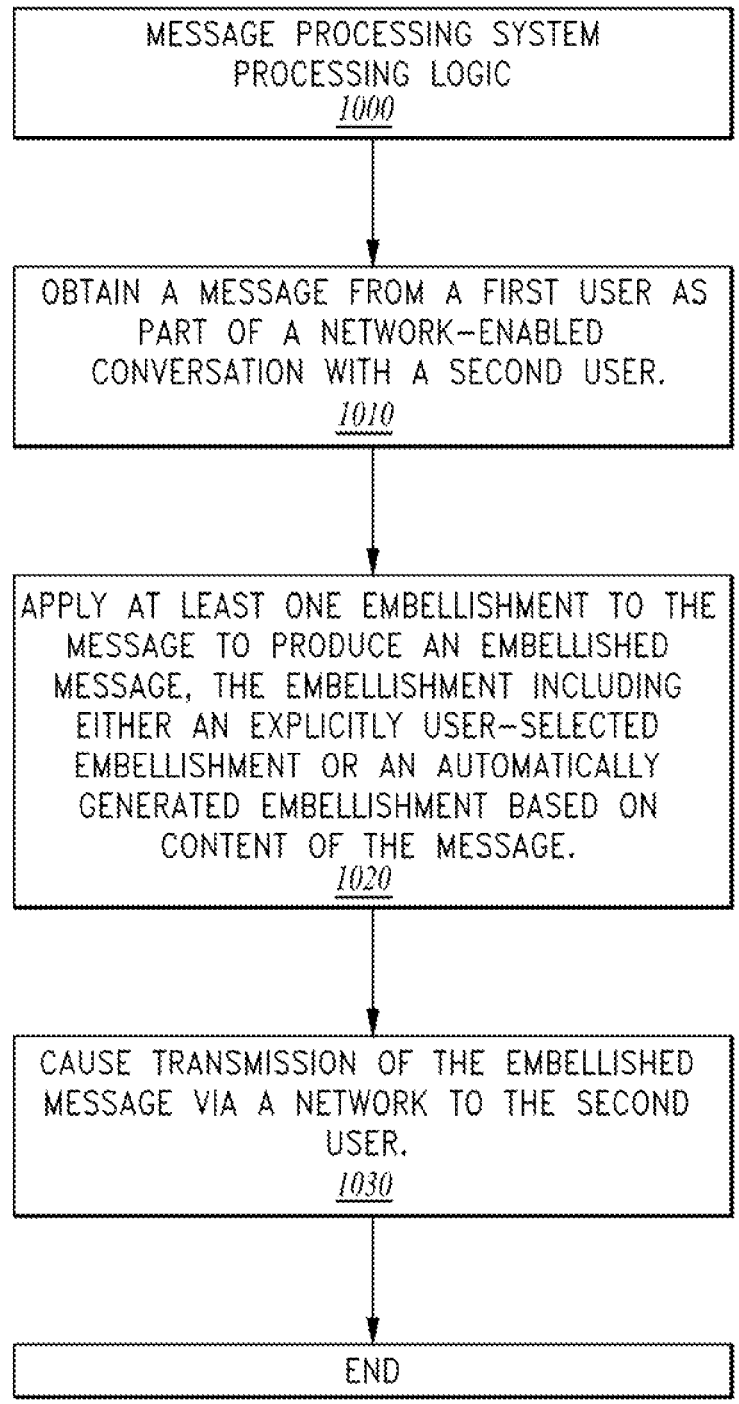
FIGS. 24 and 25 are processing flow diagrams illustrating example embodiments of the message processing performed in a message processing system as described herein.
Figure 25:
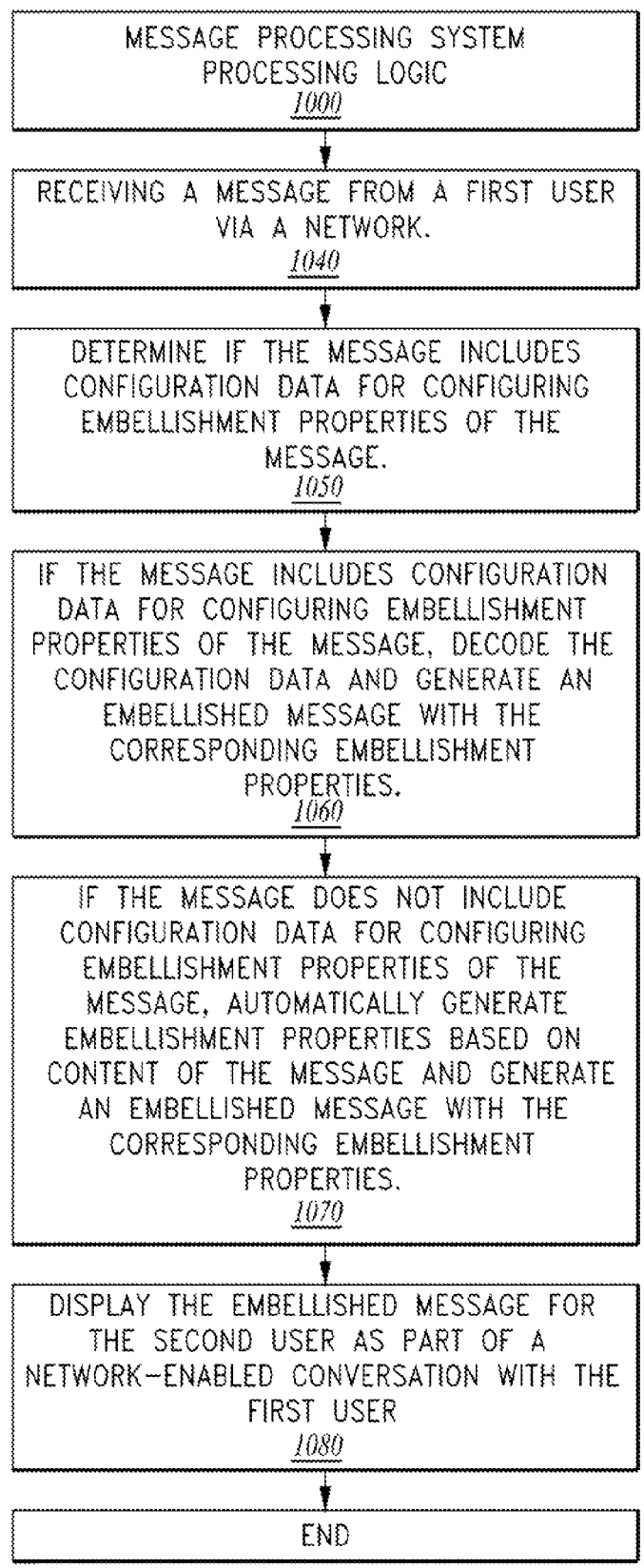

FIGS. 24 and 25 are processing flow diagrams illustrating an example embodiment of a message processing system as described herein. Referring to FIG. 24, the method of an example embodiment includes: obtaining a message from a first user as part of a network-enabled conversation with a second user (processing block 1010); applying at least one embellishment to the message to produce an embellished message, the embellishment including either an explicitly user-selected embellishment or an automatically generated embellishment based on content of the message (processing block 1020); and causing transmission of the embellished message via a network to the second user (processing block 1030).

Referring to FIG. 25, example embodiments include: receiving a message from a first user via a network (processing block 1040); determining if the message includes configuration data for configuring embellishment properties of the message (processing block 1050); if the message includes configuration data for configuring embellishment properties of the message, decoding the configuration data and generating an embellished message with the corresponding embellishment properties (processing block 1060); if the message does not include configuration data for configuring embellishment properties of the message, automatically generating embellishment, properties based on content of the message and generating an embellished message with the corresponding embellishment properties (processing block 1070); and displaying the embellished message for the second user as part of a network-enabled conversation with the first user (processing block 1080).

Figure 26:
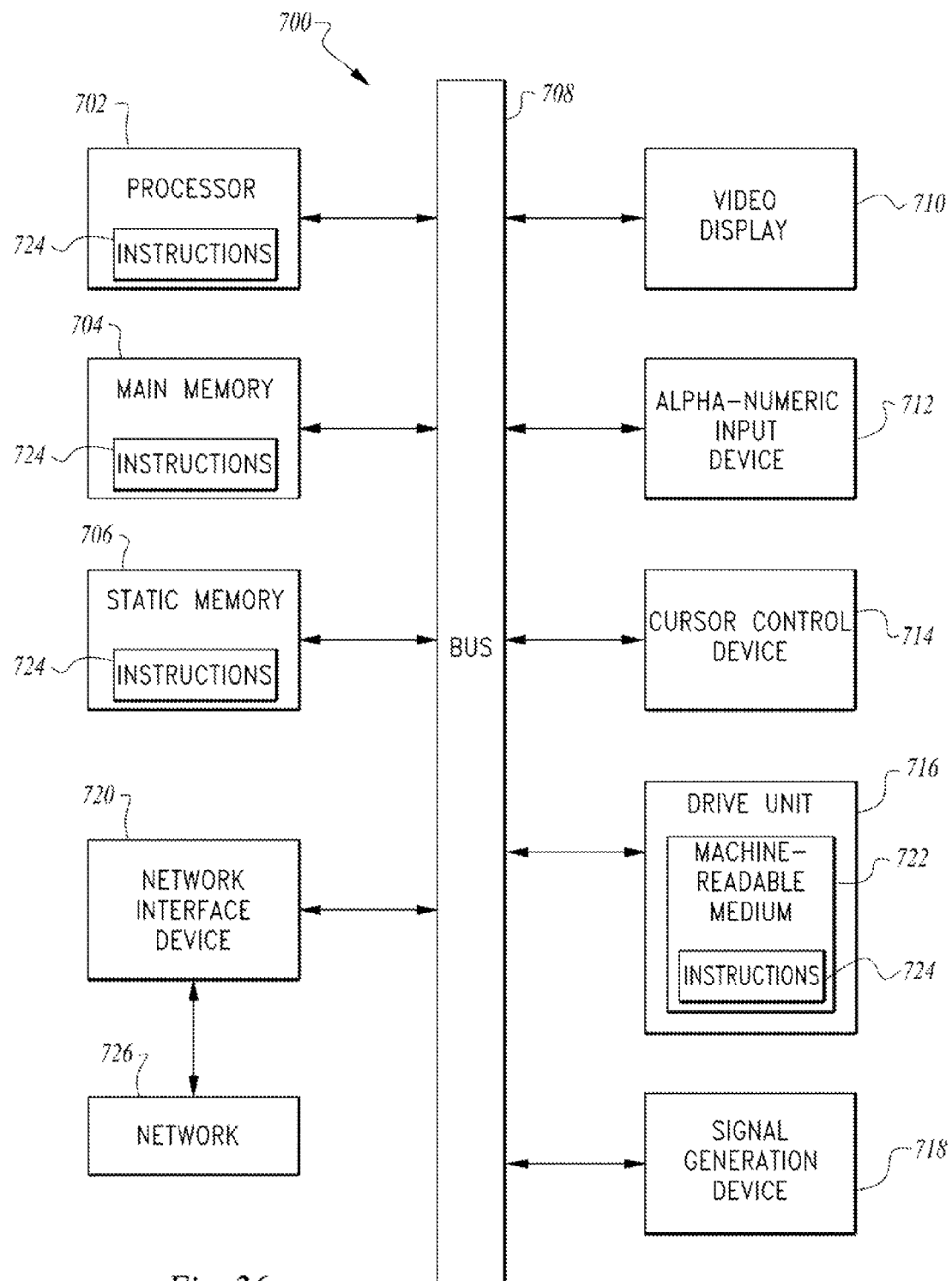
FIG. 26 shows a diagrammatic representation of machine in the example form of a computer system within which a set of instructions when executed may cause the machine to perform any one or more of the methodologies discussed herein.

FIG. 26 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium, or combination of transitory media collaborating to create a non-transitory or semi-non-transitory medium, that is capable of storing, encoding or carrying a set of instructions for execution by the machine and that cause the machine to perform any one or more of the methodologies of the various embodiments, or that, is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   obtaining a message from a first user as part of a network-enabled conversation with a second user, the conversation having a plurality of associated messages;
   analyzing, by use of a processor, the content of the message;
   automatically selecting a panel layout based on the content of the message, the panel layout defining a consistent set of expressive elements for the plurality of messages associated with the conversation, the panel layout further defining a plurality of panels for presenting a series of the messages of the conversation with the expressive elements;
   integrating the message into at least one of the plurality of panels with the expressive elements;
   automatically selecting at least one embellishment from an available set of embellishment options based on the selected panel layout;

applying, by use of the processor, the automatically selected at least one embellishment to the message to produce an embellished message with configuration data encoded therewith corresponding to the at least one embellishment, the configuration data including a plurality of data values defining particular embellishment properties of the at least one embellishment; and causing transmission of the embellished message via a network to the second user.

2. The method as claimed in claim 1 including enabling the first user to compose the message.

3. The method as claimed in claim 1 including enabling the first user to purchase an embellishment and applying the user-purchased embellishment to the message.

4. The method as claimed in claim 1 including displaying a catalog of embellishments for purchase by the first user.

5. A method comprising:

receiving a message from a first user via a network, the message being part of a network-enabled conversation with a second user, the conversation having a plurality of associated messages;

determining if the message includes configuration data for configuring embellishment properties of the message;

if the message includes configuration data for configuring embellishment properties of the message, decoding, by use of a processor, the configuration data and generating an embellished message with the corresponding embellishment properties;

if the message does not include configuration data for configuring embellishment properties of the message, analyzing the content of the message, automatically selecting a panel layout based on the content of the message, the panel layout defining a consistent set of expressive elements for the plurality of messages associated with the conversation, the panel layout further defining a plurality of panels for presenting a series of the messages of the conversation with the expressive elements, integrating the message into at least one of the plurality of panels with the expressive elements, automatically generating embellishment properties based on the selected panel layout, and generating an embellished message with the corresponding automatically generated embellishment properties; and displaying the plurality of panels of the conversation including the embellished message with the expressive elements for the second user as part of the conversation with the first user.

6. The method as claimed in claim 5 including enabling the second user to browse messages of the conversation.

7. The method as claimed in claim 5 wherein the embellishment properties include an avatar.

8. The method as claimed in claim 5 wherein the embellishment properties include instructions to animate an avatar.

9. The method as claimed in claim 5 wherein the received message is a non-embellished message received from a sender.

10. The method as claimed in claim 5 wherein the conversation is displayed to the first and second users as the plurality of panels with the expressive elements presented in a plurality of comic book-style panels.

11. A system comprising:

a data processor;

a network connection, in data communication with the processor, for access to a network; and a message processing system, executable by the processor, to:

obtain a message from a first user as part of a network-enabled conversation with a second user, the conversation having a plurality of associated messages;

analyze the content of the message;

automatically select a panel layout based on the content of the message, the panel layout defining a consistent set of expressive elements for the plurality of messages associated with the conversation, the panel layout further defining a plurality of panels for presenting a series of the messages of the conversation with the expressive elements;

integrate the message into at least one of the plurality of panels with the expressive elements;

automatically select at least one embellishment from an available set of embellishment options based on the selected panel layout;

apply the automatically selected at least one embellishment to the message to produce an embellished message with configuration data encoded therewith corresponding to the at least one embellishment, the configuration data including a plurality of data values defining particular embellishment properties of the at least one embellishment; and cause transmission of the embellished message via a network to the second user.

12. The system as claimed in claim 11 being further configured to enable the first user to compose the message.

13. The system as claimed in claim 11 being further configured to enable the first user to purchase an embellishment and applying the user-purchased embellishment to the message.

14. The system as claimed in claim 11 being further configured to display a catalog of embellishments for purchase by the first user.

15. A system comprising:

a data processor;

a network connection, in data communication with the processor, for access to a network; and a message processing system, executable by the processor, to:

receive a message from a first user via a network, the message being part of a network-enabled conversation with a second user, the conversation having a plurality of associated messages;

determine if the message includes configuration data for configuring embellishment properties of the message;

if the message includes configuration data for configuring embellishment properties of the message, decode the configuration data and generate an embellished message with the corresponding embellishment properties;

if the message does not include configuration data for configuring embellishment properties of the message, analyze the content of the message, automatically select a panel layout based on the content of the message, the panel layout defining a consistent set of expressive elements for the plurality of messages associated with the conversation, the panel layout further defining a plurality of panels for presenting a series of the messages of the conversation with the expressive elements, integrate the message into at least one of the plurality of panels with the expressive elements, automatically generate embellishment properties based on the selected panel layout, and generate an embellished message with the corresponding automatically generated embellishment properties; and display the plurality of panels of the conversation including the embellished message with the expressive elements for the second user as part of the conversation with the first user.

16. The system as claimed in claim 15 being further configured to enable the second user to browse messages of the conversation.

17. The system as claimed in claim 15 wherein the embellishment properties include an avatar.

18. The system as claimed in claim 15 wherein the embellishment properties include instructions to animate an avatar.

19. The system as claimed in claim 15 wherein the received message is a non-embellished message received from a sender.

20. The system as claimed in claim 15 wherein the conversation is displayed to the first and second users as the plurality of panels with the expressive elements presented in a plurality of comic book-style panels.

21. A non-transitory machine-useable storage medium embodying instructions which, when executed by a machine, cause the machine to:
obtain a message from a first user as part of a network-enabled conversation with a second user, the conversation having a plurality of associated messages;
analyze the content of the message;
automatically select a panel layout based on the content of the message, the panel layout defining a consistent set of expressive elements for the plurality of messages associated with the conversation, the panel layout further defining a plurality of panels for presenting a series of the messages of the conversation with the expressive elements;
integrate the message into at least one of the plurality of panels with the expressive elements;
automatically select at least one embellishment from an available set of embellishment options based on the selected panel layout;
apply the automatically selected at least one embellishment to the message to produce an embellished message with configuration data encoded therewith corresponding to the at least one embellishment, the configuration data including a plurality of data values defining particular embellishment properties of the at least one embellishment; and
cause transmission of the embellished message via a network to the second user.

22. A non-transitory machine-useable storage medium embodying instructions which, when executed by a machine, cause the machine to:
receive a message from a first user via a network, the message being part of a network-enabled conversation with a second user, the conversation having a plurality of associated messages;
determine if the message includes configuration data for configuring embellishment properties of the message;
if the message includes configuration data for configuring embellishment properties of the message, decode the configuration data and generate an embellished message with the corresponding embellishment properties;
if the message does not include configuration data for configuring embellishment properties of the message, analyze the content of the message, automatically select a panel layout based on the content of the message, the panel layout defining a consistent set of expressive elements for the plurality of messages associated with the conversation, the panel layout further defining a plurality of panels for presenting a series of the messages of the conversation with the expressive elements, integrate the message into at least one of the plurality of panels with the expressive elements, automatically generate embellishment properties based on the selected panel layout, and generate an embellished message with the corresponding automatically generated embellishment properties; and
displaying the plurality of panels of the conversation including the embellished message with the expressive elements for the second user as part of the conversation with the first user.

23. A system comprising:
a data processor;
a network connection, in data communication with the processor, for access to a network; and
a message processing system, executable by the processor, to:
receive, via a network, a first message from a user as part of a conversation including a plurality of messages; determine if the first message includes configuration data encoded therewith for configuring embellishment properties of the first message, the configuration data including a plurality of data values defining particular embellishment properties of the first message; analyze the content of the first message; automatically determine an initial panel layout for display of the first message based on the content of the first message, the panel layout defining a consistent set of expressive elements for the plurality of messages associated with the conversation, the panel layout further defining a plurality of panels for presenting a series of the messages of the conversation with the expressive elements, integrate the first message into at least one of the plurality of panels with the expressive elements; and present the plurality of panels of the conversation including the first message with the expressive elements.

24. The system as claimed in claim 23 being further configured to:
receive, via the network, a second message from another user as part of the conversation;
determine a relationship between the first message and the second message; select a panel layout for the second message based at least in part on the relationship between the first message and the second message; and present the second message in a message panel of the plurality of panels of the conversation with the expressive elements corresponding to the selected panel layout.

25. The system as claimed in claim 23 being further configured to: receive, via the network, a second message from another user as part of the conversation; determine a relationship between the first message and the second message; select a panel layout based at least in part on the relationship between the first message and the second message; present the second message in a message panel of the plurality of panels of the conversation with the expressive elements corresponding to the selected panel layout; and present the first message in a message panel of the plurality of panels of the conversation with the expressive elements corresponding to the selected panel layout.

26. The method as claimed in claim 1 including enabling the first user to compose the message and to view the message as included in the plurality of panels of the conversation with the expressive elements that will appear to the second user prior to transmission of the message to the second user.

27. A method comprising:
  obtaining a message from a first user as part of a network-enabled conversation with a second user, the conversation having a plurality of associated messages;
  determining a panel layout, the panel layout defining a consistent set of expressive elements for the plurality of messages associated with the conversation, the panel layout further defining a plurality of panels for presenting a series of the messages of the conversation with the expressive elements;
  integrating the message into at least one of the plurality of panels with the expressive elements;
  enabling the first user to purchase an embellishment;
  applying, by use of the processor, the user-purchased embellishment to the message to produce an embellished message with configuration data encoded therewith corresponding to the user-purchased embellishment, the configuration data including a plurality of data values defining particular embellishment properties of the at least one embellishment; and
  causing transmission of the embellished message via a network to the second user.

28. The method as claimed in claim 27 including enabling the first user to compose the message and to view the embellished message as the embellished message will appear to the second user prior to transmission of the embellished message to the second user.

29. The method as claimed in claim 27 including enabling the first user to explicitly apply the user-purchased embellishment to the message.

* * * * *